United States Patent
Kondo

(10) Patent No.: US 12,518,791 B2
(45) Date of Patent: Jan. 6, 2026

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masayuki Kondo, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/781,503

(22) Filed: Jul. 23, 2024

(65) Prior Publication Data
US 2025/0292797 A1 Sep. 18, 2025

(30) Foreign Application Priority Data
Mar. 15, 2024 (JP) .................. 2024-040658

(51) Int. Cl.
*G11B 20/10* (2006.01)
*G11B 20/12* (2006.01)

(52) U.S. Cl.
CPC .... *G11B 20/10481* (2013.01); *G11B 20/1217* (2013.01); *G11B 2020/1297* (2013.01)

(58) Field of Classification Search
None
See application file for complete search history.

(56) References Cited

U.S. PATENT DOCUMENTS

| | | | |
|---|---|---|---|
| 6,445,521 B1* | 9/2002 | Schaff | G11B 27/36 |
| 8,089,716 B2* | 1/2012 | Takayama | G11B 5/584 |
| | | | 360/48 |
| 8,724,248 B2 | 5/2014 | Dhanda et al. | |
| 8,867,161 B2 | 10/2014 | Emo et al. | |
| 8,908,310 B1* | 12/2014 | Bai | G11B 20/1217 |
| | | | 360/48 |
| 9,281,008 B1* | 3/2016 | Harllee, III | G11B 20/1217 |
| 9,972,353 B1 | 5/2018 | Qiang et al. | |
| 10,910,013 B1* | 2/2021 | Kawabe | G11B 20/1217 |
| 11,074,937 B1* | 7/2021 | Kawai | G11B 20/1258 |
| 2005/0069298 A1* | 3/2005 | Kasiraj | G11B 27/11 |
| 2006/0232874 A1* | 10/2006 | Tsuchinaga | G11B 5/59633 |
| | | | 360/75 |
| 2013/0057978 A1 | 3/2013 | Sakai et al. | |
| 2014/0098438 A1* | 4/2014 | Poudyal | G11B 5/09 |
| | | | 360/55 |
| 2016/0148641 A1* | 5/2016 | Gao | G11B 20/1217 |
| | | | 369/13.35 |

(Continued)

FOREIGN PATENT DOCUMENTS

JP 5548993 A 7/2014

*Primary Examiner* — Peter Vincent Agustin
(74) *Attorney, Agent, or Firm* — Knobbe, Martens, Olson & Bear, LLP

(57) ABSTRACT

According to one embodiment, a disk device including a head, a disk, and a controller is provided. The disk includes at least one band. When a target track is written while being partially overlapped with a track adjacent to the target track in each of the at least one band, the controller writes a plurality of tracks in the band such that a track pitch on the head side of the band is larger than the other track pitches in at least a part of a circumferential position range.

18 Claims, 25 Drawing Sheets

(56) References Cited

U.S. PATENT DOCUMENTS

| | | | |
|---|---|---|---|
| 2016/0148645 A1* | 5/2016 | Zhu | G11B 20/1217 |
| | | | 360/48 |
| 2017/0330591 A1* | 11/2017 | Granz | G11B 7/126 |
| 2018/0182432 A1* | 6/2018 | Liu | G11B 5/59633 |
| 2021/0280215 A1* | 9/2021 | Fukawa | G11B 20/1217 |

* cited by examiner

FIG.3A
FIG.3B
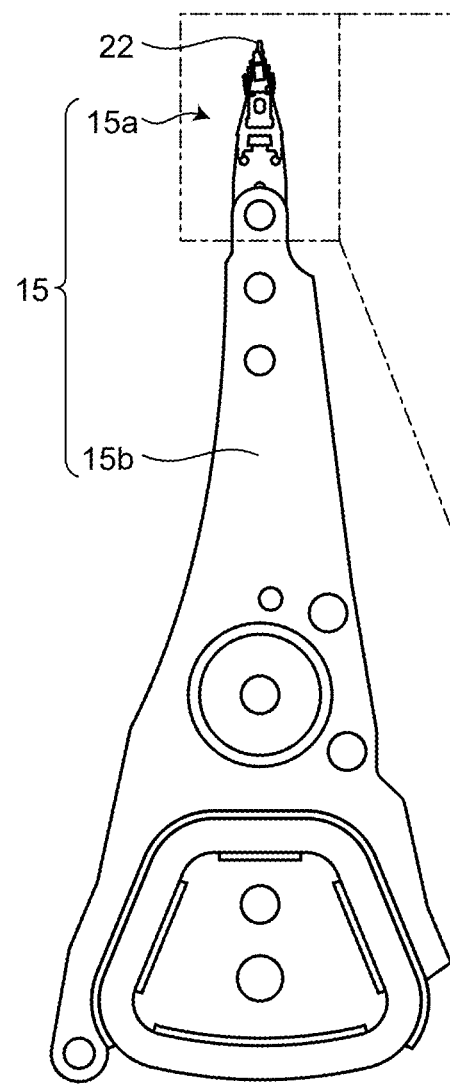
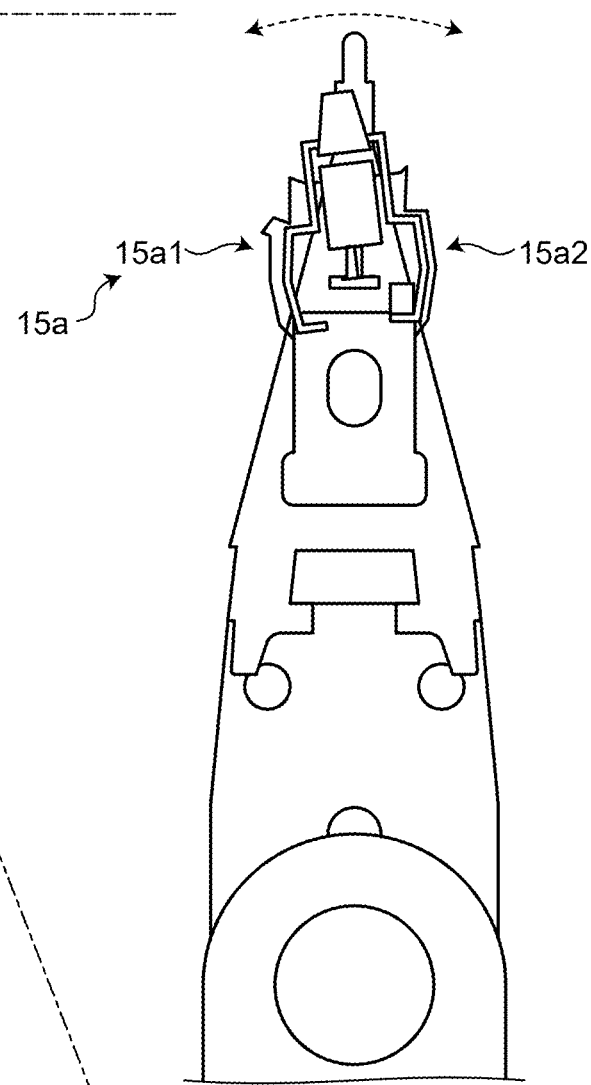

FIG.10

| READ FLAG | | | PROCESSING CONTENTS |
|---|---|---|---|
| 1 | 2 | 3 | |
| 0 | 1 | 0 | SHIFT CENTER OFFSET OF HEAD TRACK TOWARD ADJACENT BAND SIDE BY PREDETERMINED AMOUNT AND MOVE TO (4) |
| 0 | 0 | 1 | SHIFT CENTER OFFSET OF HEAD TRACK TOWARD SECOND TRACK SIDE BY PREDETERMINED AMOUNT AND MOVE TO (4) |
| 0 | 1 | 1 | REDUCE WOS1 BY PREDETERMINED AMOUNT AND MOVE TO (3) |
| 1 | 0 | 0 | SHIFT CENTER OFFSET OF HEAD TRACK TOWARD SECOND TRACK SIDE BY PREDETERMINED AMOUNT AND MOVE TO (4) |
| 1 | 1 | 0 | REDUCE WOS1 BY PREDETERMINED AMOUNT AND MOVE TO (3) |
| 1 | 0 | 1 | SHIFT CENTER OFFSET OF HEAD TRACK TOWARD SECOND TRACK SIDE BY PREDETERMINED AMOUNT AND MOVE TO (4) |
| 1 | 1 | 1 | REDUCE WOS1 BY PREDETERMINED AMOUNT AND MOVE TO (3) |

FIG.18

| READ FLAG | | | | PROCESSING CONTENTS |
|---|---|---|---|---|
| 1 | 2 | 3 | 4 | |
| 0 | 0 | 1 | 0 | INCREASE T22 BY PREDETERMINED AMOUNT AND MOVE TO (9) |
| 0 | 0 | 0 | 1 | SHIFT CENTER OFFSET OF HEAD TRACK TOWARD SECOND TRACK SIDE BY PREDETERMINED AMOUNT AND MOVE TO (8) |
| 0 | 0 | 1 | 1 | REDUCE WOS2 BY PREDETERMINED AMOUNT AND MOVE TO (7) |
| 0 | 1 | 0 | 0 | SHIFT CENTER OFFSET OF HEAD TRACK TOWARD ADJACENT BAND SIDE BY PREDETERMINED AMOUNT AND MOVE TO (8) |
| 0 | 1 | 1 | 0 | SHIFT CENTER OFFSET OF HEAD TRACK TOWARD ADJACENT BAND SIDE BY PREDETERMINED AMOUNT AND MOVE TO (8) |
| 0 | 1 | 0 | 1 | REDUCE WOS2 BY PREDETERMINED AMOUNT AND MOVE TO (7) |
| 0 | 1 | 1 | 1 | REDUCE WOS2 BY PREDETERMINED AMOUNT AND MOVE TO (7) |
| 1 | 0 | 0 | 0 | SHIFT CENTER OFFSET OF HEAD TRACK TOWARD SECOND TRACK SIDE BY PREDETERMINED AMOUNT AND MOVE TO (8) |
| 1 | 0 | 1 | 0 | REDUCE WOS2 BY PREDETERMINED AMOUNT AND MOVE TO (7) |
| 1 | 0 | 0 | 1 | SHIFT CENTER OFFSET OF HEAD TRACK TOWARD SECOND TRACK SIDE BY PREDETERMINED AMOUNT AND MOVE TO (8) |
| 1 | 0 | 1 | 1 | REDUCE WOS2 BY PREDETERMINED AMOUNT AND MOVE TO (7) |
| 1 | 1 | 0 | 0 | REDUCE WOS2 BY PREDETERMINED AMOUNT AND MOVE TO (7) |
| 1 | 1 | 1 | 0 | REDUCE WOS2 BY PREDETERMINED AMOUNT AND MOVE TO (7) |
| 1 | 1 | 0 | 1 | REDUCE WOS2 BY PREDETERMINED AMOUNT AND MOVE TO (7) |
| 1 | 1 | 1 | 1 | REDUCE WOS2 BY PREDETERMINED AMOUNT AND MOVE TO (7) |

FIG.25

| READ FLAG | | | PROCESSING CONTENTS |
|---|---|---|---|
| 1 | 2 | 3 | |
| 0 | 1 | 0 | SHIFT CENTER OFFSET OF HEAD TRACK TOWARD ADJACENT BAND SIDE BY PREDETERMINED AMOUNT AND MOVE TO (12) |
| 0 | 0 | 1 | SHIFT CENTER OFFSET OF HEAD TRACK TOWARD SECOND TRACK SIDE BY PREDETERMINED AMOUNT AND MOVE TO (12) |
| 0 | 1 | 1 | REDUCE WOS3 BY PREDETERMINED AMOUNT AND MOVE TO (11) |
| 1 | 0 | 0 | SHIFT CENTER OFFSET OF HEAD TRACK TOWARD SECOND TRACK SIDE BY PREDETERMINED AMOUNT AND MOVE TO (12) |
| 1 | 1 | 0 | REDUCE WOS3 BY PREDETERMINED AMOUNT AND MOVE TO (11) |
| 1 | 0 | 1 | SHIFT CENTER OFFSET OF HEAD TRACK TOWARD SECOND TRACK SIDE BY PREDETERMINED AMOUNT AND MOVE TO (12) |
| 1 | 1 | 1 | REDUCE WOS3 BY PREDETERMINED AMOUNT AND MOVE TO (11) |

DISK DEVICE

CROSS-REFERENCE TO RELATED APPLICATIONS

This application is based upon and claims the benefit of priority from Japanese Patent Application No. 2024-040658, filed on Mar. 15, 2024; the entire contents of which are incorporated herein by reference.

FIELD

Embodiments described herein relate generally to a disk device.

BACKGROUND

In a disk device, a target track may be written while being partially overlapped with a track adjacent to the target track in each band of a disk including a plurality of bands. In the disk device, it is desirable to speed up write processing of writing the target track.

BRIEF DESCRIPTION OF THE DRAWINGS

FIGS. 3A and 3B are diagrams illustrating configurations of an actuator arm and a head in the first embodiment;

FIG. 10 is a diagram illustrating read flag determination processing in the second embodiment;

FIG. 18 is a diagram illustrating read flag determination processing in the fourth embodiment;

FIG. 25 is a diagram illustrating read flag determination processing in the sixth embodiment.

DETAILED DESCRIPTION

In general, according to one embodiment, a disk device including a head, a disk, and a controller is provided. The disk includes at least one band. When a target track is written while being partially overlapped with a track adjacent to the target track in each of the at least one band, the controller writes a plurality of tracks in the band such that a track pitch on the head side of the band is larger than the other track pitches in at least a part of a circumferential position range.

Exemplary embodiments of a disk device will be explained below in detail with reference to the accompanying drawings. The present invention is not limited to the following embodiments.

First Embodiment

In a disk device according to a first embodiment, a target track is written while being partially overlapped with a track adjacent to the target track in each band of a disk including a plurality of bands, and a device is provided in which the write processing of writing the target track is speeded up.

Figure 1:
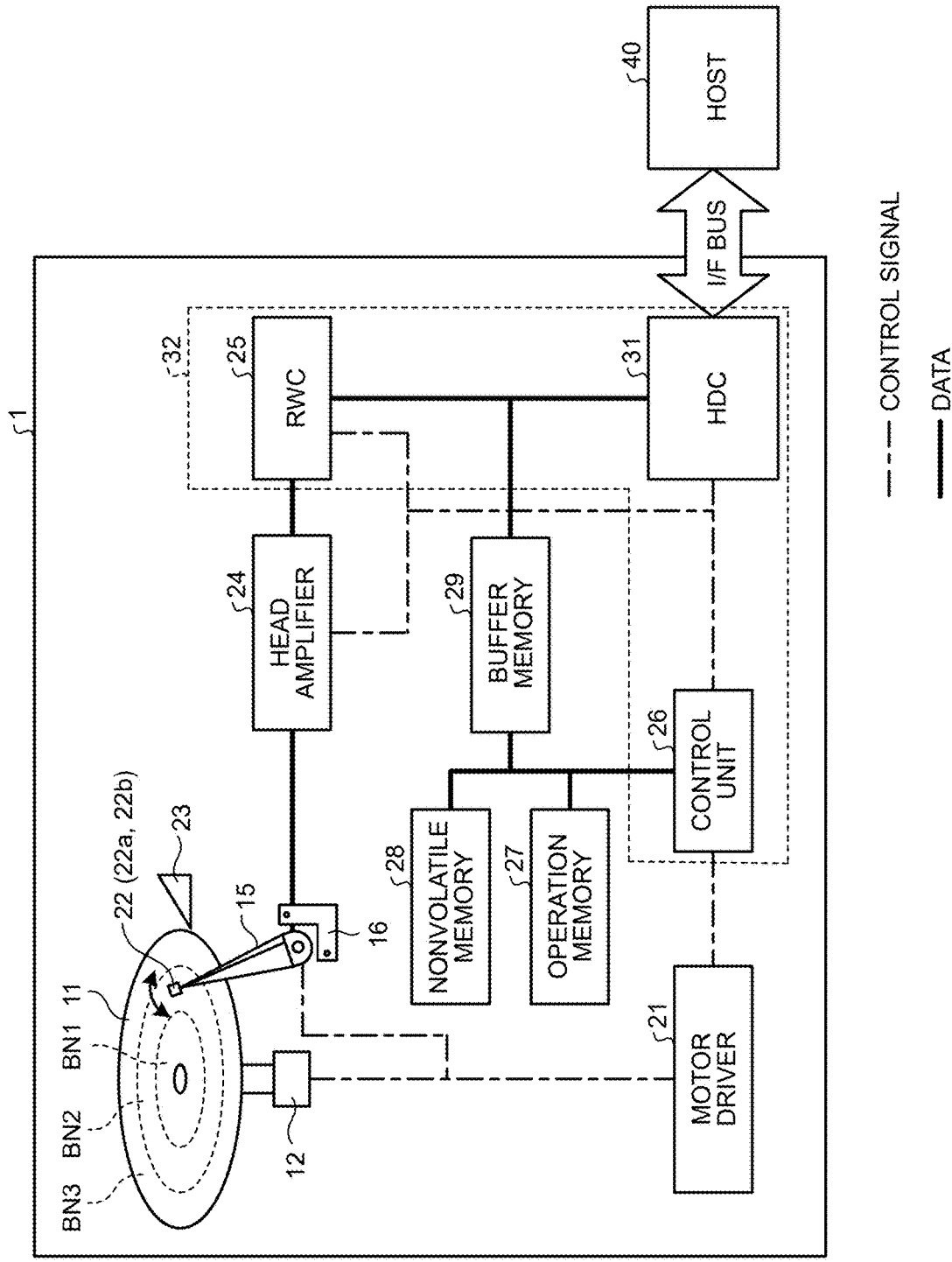
FIG. 1 is a diagram illustrating a configuration of a disk device according to a first embodiment.

A disk device 1 according to the first embodiment will be described with reference to FIG. 1. FIG. 1 is a diagram illustrating a configuration of the disk device 1.

The disk device 1 is a device that records information on a disk 11 by a head 22, and may be, for example, a magnetic disk device or an optical disk device. Specifically, the disk device 1 includes the disk 11, a spindle motor 12, a motor driver 21, the head 22, an actuator arm 15, a voice coil motor (VCM) 16, a lamp 23, a head amplifier 24, a read/write channel (RWC) 25, a hard disk controller (HDC) 31, a buffer memory 29, and a control unit 26.

The disk 11 is rotated at a predetermined rotation speed about a rotation axis by the spindle motor 12. The rotation of the spindle motor 12 is driven by the motor driver 21.

The head 22 writes and reads data to and from the disk 11 using a write element 22a and a read element 22b provided in the head 22. The head 22 is located at the tip of the actuator arm 15 and is moved in the radial direction (in the track width direction) of the disk 11 by the voice coil motor 16 driven by the motor driver 21. When the rotation of the disk 11 is stopped, the head 22 is retracted onto the lamp 23.

The head amplifier 24 amplifies and outputs a signal read from the disk 11 by the head 22, and supplies the amplified signal to the RWC 25. In addition, the head amplifier 24 amplifies a signal supplied from the RWC 25 for writing data to the disk 11, and supplies the amplified signal to the head 22.

The HDC 31 controls transmission and reception of data with a host computer 40 with an I/F bus interposed therebetween, controls the buffer memory 29, and performs data error correction processing on write data. In addition, the buffer memory 29 is used as a cache of data to be transmitted to and received from the host computer 40. Further, the buffer memory 29 is used for temporarily storing data read from the disk 11, data to be written to the disk 11, or control firmware read from the disk 11.

The RWC 25 code-modulates data to be written to the disk 11 supplied from the HDC 31, and supplies the data to the head amplifier 24. In addition, the RWC 25 code-demodulates a signal read from the disk 11 and supplied from the head amplifier 24, and outputs the signal to the HDC 31 as digital data.

An operation memory 27 (for example, a static random access memory (SRAM)), a nonvolatile memory 28 (for example, a flash read only memory (flash ROM)), and a buffer memory 29 (for example, a dynamic random access memory (DRAM)) for temporary storage are connected to the control unit 26. The control unit 26 performs overall control of the disk device 1 according to firmware stored in advance in the nonvolatile memory 28 and the disk 11. The firmware is initial firmware and control firmware used for normal operation. The initial firmware executed first at the time of booting is stored in the nonvolatile memory 28. The control firmware includes an information recording program to be described later. In addition, the control firmware used for normal operation is recorded in the disk 11, is temporarily read from the disk 11 to the buffer memory 29 by control according to the initial firmware, and then is stored in the operation memory 27.

Note that a hardware configuration including the RWC 25, the HDC 31, and the control unit 26 can also be regarded as a controller 32. The controller 32 can be configured as a one-chip integrated circuit (system on chip). The package of the controller 32 can be disposed on a printed circuit board outside a case (not illustrated) that houses the disk 11, the spindle motor 12, the motor driver 21, the head 22, the actuator arm 15, the voice coil motor (VCM) 16, and the like.

In the disk device 1, a plurality of tracks is concentrically defined on the disk 11 by servo information written in advance on the disk 11.

In the present specification, a track defined by servo information is referred to as a servo track, and a track written by the write element 22a is referred to as a data track to be distinguished from each other.

In the disk device 1, the write element 22a writes data to a plurality of servo tracks, for example, in order from the inside to the outside or in order from the outside to the inside, and a data track is formed on the disk 11.

Here, the disk device 1 adopts a shingled magnetic recording method (SMR method) as a method of further increasing a recording capacity to the disk 11. In the SMR method, a servo track width (≈servo track pitch STP) of the disk 11 is narrower than a main magnetic pole width of the write element 22a. Therefore, when writing is performed by the write element 22a, the disk device 1 performs writing by partial overwriting between a data track to be written and an adjacent data track.

Figure 2:
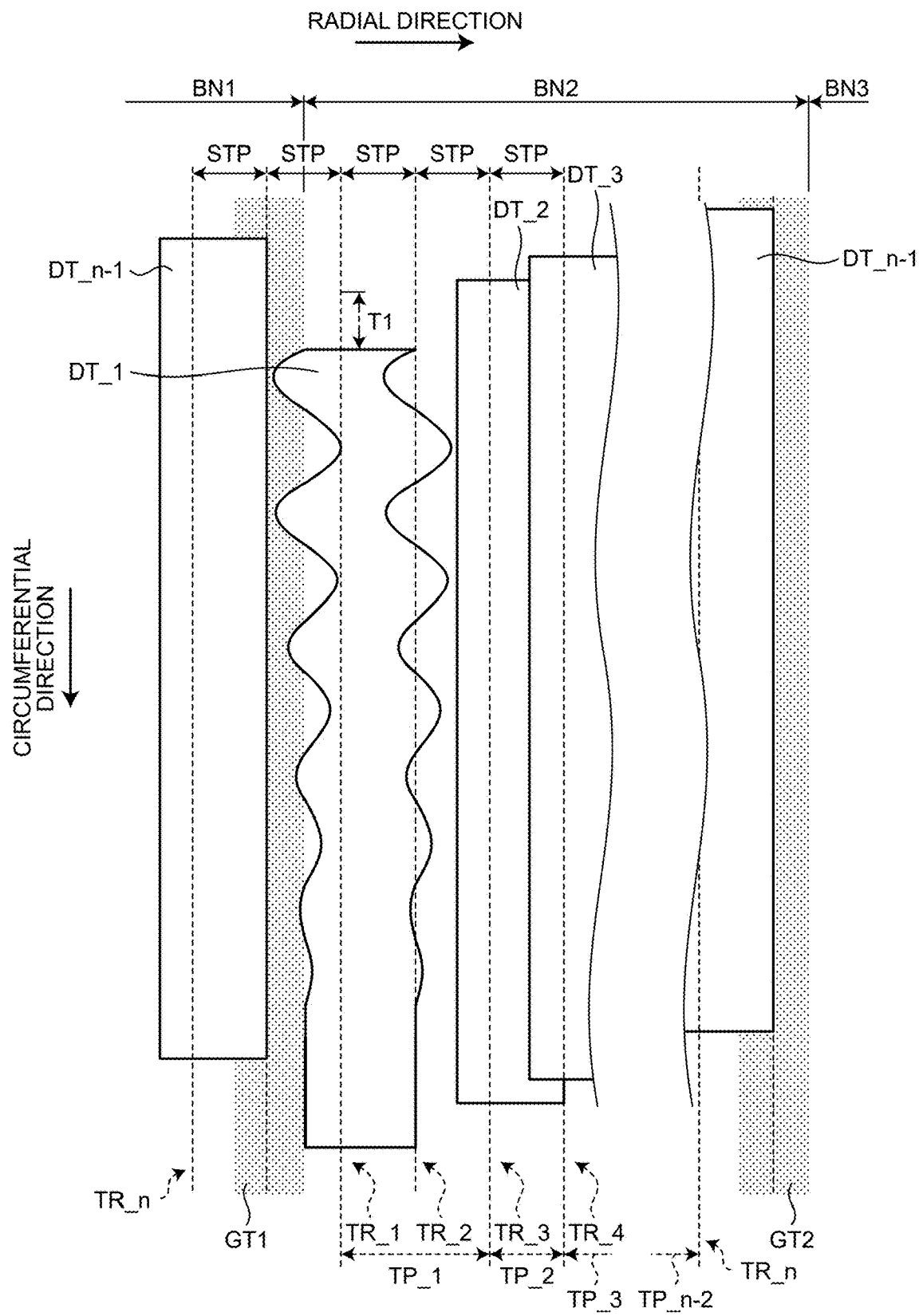
FIG. 2 is a diagram illustrating a configuration of a data track in the first embodiment.

In the SMR method, the disk device 1 can group a plurality of servo tracks for each of one or more adjacent servo tracks to form a band BN. FIG. 1 illustrates a configuration in which three bands BN1 to BN3 are provided on the disk 11, but the number of bands BN may be 1, 2, 4 or more. As illustrated in FIG. 2, guard tracks GT1 and GT2 are provided between the plurality of bands BN1 to BN3. FIG. 2 is a diagram illustrating a configuration of the data track. No data is written to the guard tracks GT1 and GT2. FIG. 2 illustrates a configuration in which each band BN includes n servo tracks TR. n is an arbitrary integer of 2 or more.

The disk device 1 selects the band BN to be written among the plurality of bands BN1 to BN3. FIG. 2 illustrates a case in which the band BN2 is selected. The disk device 1 sets a head servo track TR_1 of the selected band BN2 as a target track of the head 22, and causes the actuator arm 15 to seek and perform writing by the write element 22a. Here, the actuator arm 15 can be vibrated in a radial direction.

With respect to the vibration in the radial direction, the actuator arm 15 includes a micro-actuator 15a between an arm body 15b and the head 22 as illustrated in FIG. 3A. During seeking, the micro-actuator 15a is subjected to vibration control to suppress vibration in the radial direction, as indicated by a dotted arrow in FIG. 3B. However, when the amount of vibration in the radial direction is large, vibration in the radial direction may remain in the actuator arm 15 even though vibration application control is performed by the micro-actuator 15a.

Due to the vibration, a portion on the head side of a data track DT_1 extends in a circumferential direction while undulating in the radial direction as illustrated in FIG. 2, and an off-track amount may become relatively large. Thereafter, when the adjacent data track is written in an adjacent servo track TR_2 by the write element 22a, there is a possibility that the data of the data track DT_1 is overwritten with the adjacent data track and is lost.

Note that, in the present specification, the head side indicates a side on which the write order in the shingled magnetic recording method (SMR method) is earlier.

In the disk device 1, to avoid data erasure of the adjacent data track DT during writing, writing is allowed within a range of a certain shake or less in the radial direction. Hereinafter, the allowable shake amount during writing is referred to as an off-track slice WOSx. x is any integer. The off-track slice WOSx is mainly determined according to the servo track pitch STP, and in addition to data erasure with respect to the adjacent data track DT, the fact that the off-track slice WOSx is not erased from the adjacent data track DT after being shake written is also a determination factor of the off-track slice value. In the disk device 1, normally, in seek processing from a long distance, the processing is switched to settling processing for on-track when the target servo track TR is reached.

Figure 4:
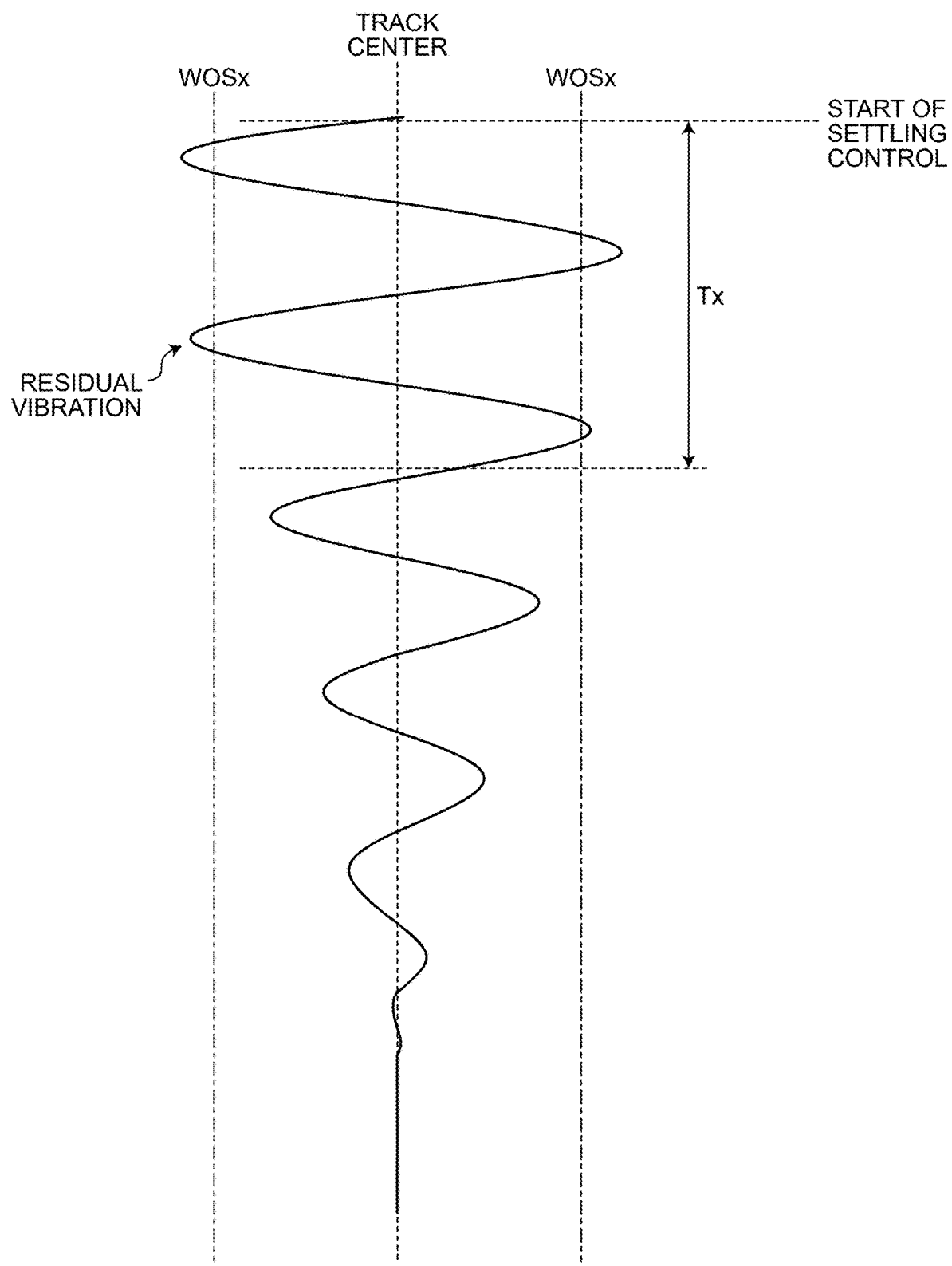
FIG. 4 is a diagram illustrating a waiting time in the first embodiment.

In the settling processing, processing of driving the arm body 15b and the micro-actuator 15a and on-tracking the head 22 to a target track in a short time as possible is performed. The shaking at the target track during the settling processing is referred to as residual vibration. When the center position of the write element 22a is traced with the start of the settling processing as a starting point, as illustrated in FIG. 4, it can be seen that residual vibration occurs with respect to the center position of the servo track TR.

The residual vibration has a larger vibration amount than that in a steady state, and the write operation is not permitted until it is determined that the residual vibration has fallen within the steady state. In the example of FIG. 4, during a waiting time Tx, the residual vibration exceeds the off-track slice WOSx and writing is not permitted, and after the waiting time Tx is elapsed, the residual vibration falls within the off-track slice WOSx and the settling processing is completed, thereby permitting writing. The waiting time Tx is a time from the start of the settling processing to the completion of the settling processing. For example, when a write start target sector is at the circumferential position corresponding to the waiting time Tx, writing starts when falling within the steady state after one round, and the write processing time is likely to be extended. The waiting time Tx of the settling processing affects a write processing speed.

Therefore, in the present embodiment, the disk device 1 writes a plurality of data tracks in the band BN such that a data track pitch on the head side of the band BN becomes larger than the other data track pitches in at least a part of the circumferential position range in the SMR method, thereby reducing the waiting time Tx of the settling processing and speeding up the write processing by the reduction of the waiting time.

A track pitch between a guard track GT of the adjacent band BN and the head data track DT_1 ensures at least one servo track pitch STP. A data track pitch TP between the head data track DT_1 and a second data track DT_2 of the band BN is set to a track arrangement greatly expanded as compared with a data track pitch TP between other data tracks in the same band BN. Here, the data track pitch TP between the head data track DT_1 and the second data track DT_2 of the band BN can be an integral multiple of the data track pitch TP between the other data tracks in the same band BN.

For example, as illustrated in FIG. 2, the disk device 1 writes the data tracks DT_1 to DT_n-1 using the servo tracks TR_1 and TR_3 to TR_n other than the second servo track TR_2 from the head side among the plurality of servo tracks TR_1 to TR_n in the band BN. As a result, a data track pitch TP_1 between the data track DT_1 and the data track DT_2 can be made larger than other data track pitches TP_2 to TP_n-2. The data track pitch TP_1 is larger than the servo track pitch STP. The data track pitches TP_2 to TP_n-2 are substantially equivalent to the servo track pitch STP.

Here, when the off-track slice of the head data track DT_1 is defined as WOS1 and the off-track slices of the second and subsequent data tracks DT_2 to DT n are each defined as WOS0, it is possible to satisfy WOS1>WOS0. That is, a standard off-track slice is defined as WOS0, and an off-track slice for adjustment larger than the standard off-track slice is defined as WOS1. The standard off-track slice WOS0 is used for most data tracks DT_2 to DT_n-1 in the band BN, but the off-track slice WOS1 for adjustment is selectively used for the head data track DT_1.

As a result, the waiting time T1 can be reduced, and the disk device 1 can write the data track DT_1 as illustrated in FIG. 2 even when the actuator arm 15 has residual vibration. As a result, as compared with a case in which the data track DT_1 can be written after waiting for a predetermined waiting time until the residual vibration of the actuator arm 15 is settled, the disk device 1 can reduce the predetermined waiting time and shorten a write processing time. WOS1 is determined to satisfy the following (Condition 1) to (Condition 3).

(Condition 1) When the second data track DT_2 in the band BN is written, the head data track DT_1 is not erased, and the head data track DT_1 can be read.

(Condition 2) When the head data track DT_1 in the band BN is written, the last data track DT_n-1 of the adjacent band BN is not erased, and the last data track DT_n-1 of the adjacent bands BN can be read.

(Condition 3) When the last data track DT_n-1 of the adjacent band BN is written, the head data track DT_1 in the band BN is not erased, and the head data track DT_1 in the band BN can be read.

The off-track slice WOS1 may be determined by the actual level of the residual vibration within a range satisfying (Condition 1) to (Condition 3). For example, an increase amount of the data track pitch TP between the head data track DT_1 and the second data track DT_2 is one track at maximum, but depending on the actual level of the residual vibration, the write processing time may be improved such that a difference (WOS1−WOS0) of the off-track slice is one track or less. Here, the data track pitch TP between the head data track DT_1 and the second data track DT_2 may be set such that (WOS1−WOS0)=half of the servo track pitch is larger than that between the other tracks. The first embodiment can be realized by making the data track pitch TP between the head data track DT_1 and the second data track DT_2 larger than the other data track pitches TP by the difference (WOS1−WOS0) of the off-track slice.

Note that, since the data track DT is written without using the second servo track TR_2 from the head, data format efficiency may decrease accordingly. A data recording pitch BPI of all tracks in the band BN may be increased to secure a data capacity equivalent to that when writing is performed using the servo track TR_2.

Figure 5:
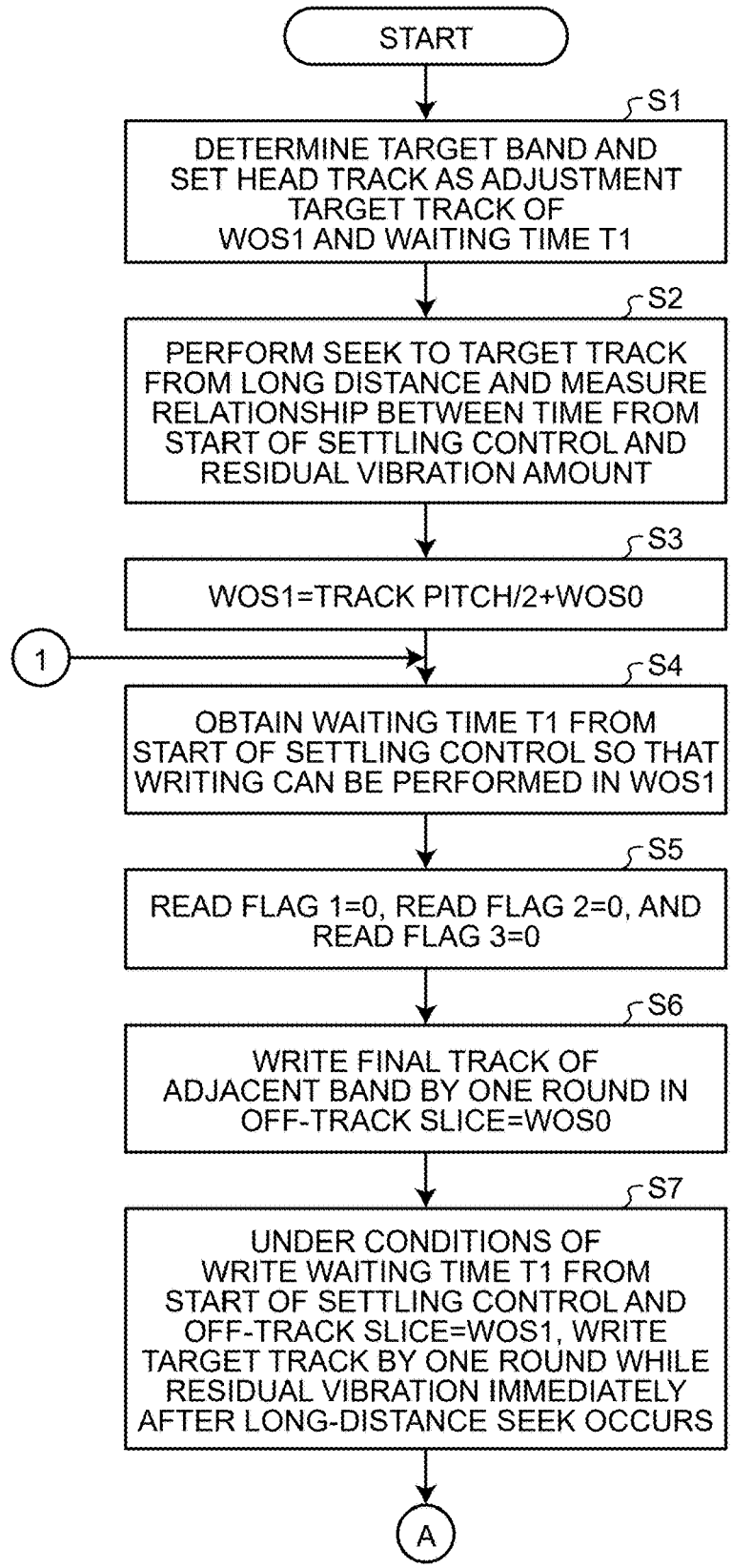
FIG. 5 is a flowchart illustrating an operation of the disk device according to the first embodiment.
Figure 6:
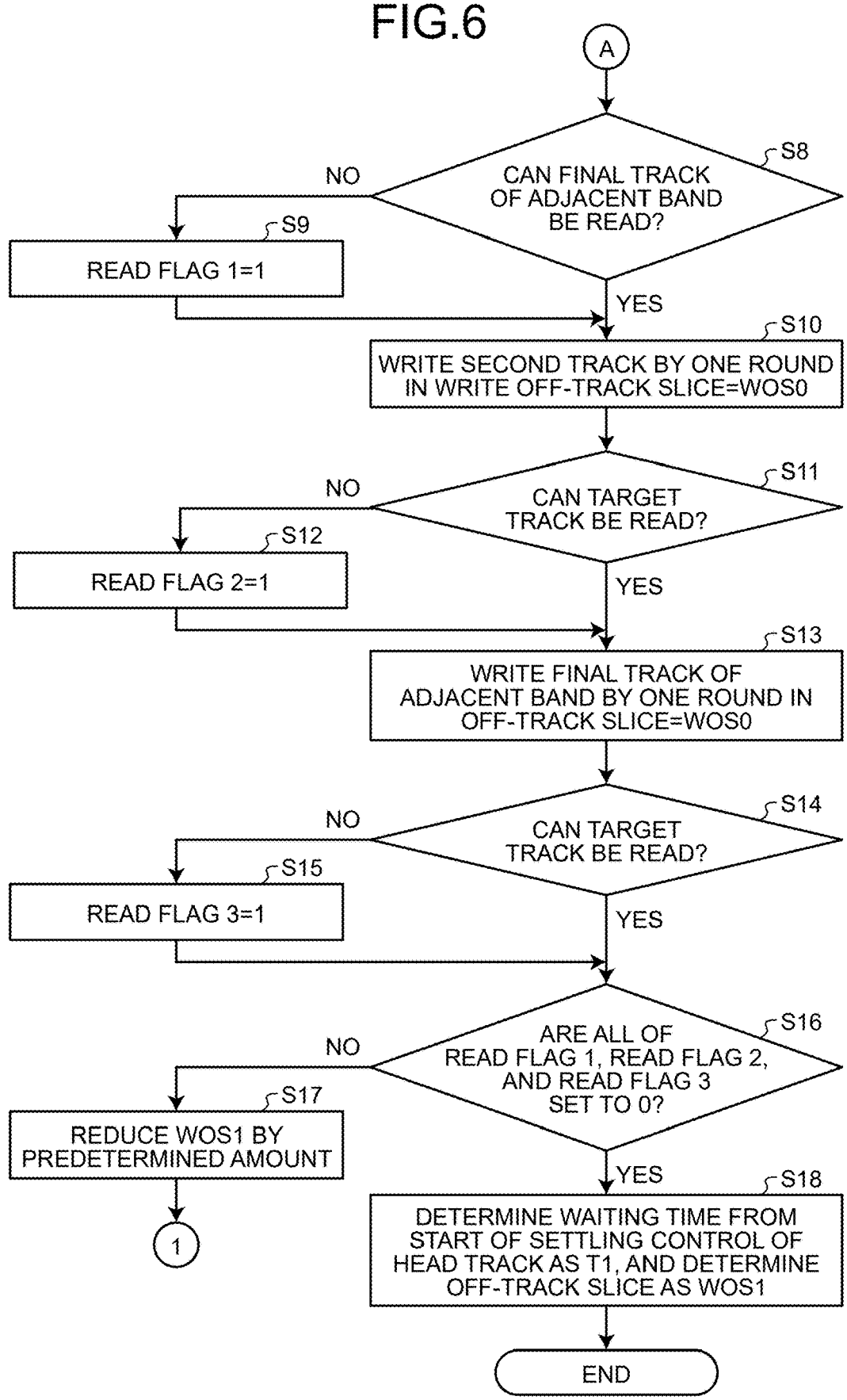
FIG. 6 is a flowchart illustrating the operation of the disk device according to the first embodiment.

Next, an operation of the disk device 1 will be described with reference to FIGS. 5 and 6. FIGS. 5 and 6 are flowcharts illustrating the operation of the disk device 1. The operation illustrated in FIGS. 5 and 6 can be mainly controlled by the controller 32.

The disk device 1 determines the target band BN, and sets the head data track DT_1 in the target band BN as the adjustment target track of WOS1 and the waiting time T1 (S1). The disk device 1 performs a seek to the adjustment target track from a long distance with respect to the head 22, and measures a relationship between a time from the start of settling control and a residual vibration amount (S2). Using the servo track pitch STP and the standard off-track slice WOS0, the disk device 1 obtains the off-track slice WOS1 for adjustment by the following Formula 1 (S3).

$$WOS1 = STP/2 + WOS0 \qquad \text{Formula 1}$$

The disk device 1 obtains the waiting time T1 from the start of the settling control such that writing can be performed in the off-track slice WOS1 (S4). The disk device 1 sets an initial value to each read flag. The disk device 1 sets a read flag 1=0, a read flag 2=0, and a read flag 3=0 (S5). The disk device 1 writes the last data track DT_n-1 of the adjacent band BN by one round in the off-track slice WOS0 (S6). Under the conditions of the waiting time T1 and the off-track slice WOS1, the disk device 1 writes the adjustment target track (data track DT_1) by one round while the residual vibration immediately after the long distance seek occurs (S7).

The disk device 1 determines whether the last data track DT_n-1 of the adjacent band BN can be read (S8). When the last data track DT_n-1 of the adjacent band BN cannot be read (No in S8), the disk device 1 sets "1" to the read flag 1 (S9).

When the last data track DT_n-1 of the adjacent band BN can be read (Yes in S8), the disk device 1 skips S9.

The disk device 1 writes the second data track DT_2 of the band BN by one round in the off-track slice WOS0 (S10).

The disk device 1 determines whether the adjustment target track (data track DT_1) can be read (S11). When the adjustment target track cannot be read (No in S11), the disk device 1 sets "1" to the read flag 2 (S12).

When the adjustment target track can be read (Yes in S11), the disk device 1 skips S12.

The disk device 1 writes the last data track DT_n-1 of the adjacent band BN by one round in the off-track slice WOS0 (S13).

The disk device 1 determines whether the adjustment target track (data track DT_1) can be read (S14). When the adjustment target track cannot be read (No in S14), the disk device 1 sets "1" to the read flag 3 (S15).

When the adjustment target track can be read (Yes in S11), the disk device 1 skips S15.

The disk device 1 determines whether all of the read flag 1, the read flag 2, and the read flag 3 are "0" (S16). When at least one read flag of the read flag 1, the read flag 2, and the read flag 3 is "1" (No in S16), the disk device 1 reduces the off-track slice WOS1 by a predetermined amount (S17) to suppress data loss, and returns the processing to S4. The predetermined amount can be experimentally determined in advance as an amount suitable for finely adjusting the off-track slice.

When all of the read flag 1, the read flag 2, and the read flag 3 are "0" (Yes in S16), the disk device 1 determines the waiting time of the head data track DT_1 in the target band BN as T1, and determines the off-track slice as WOS1 (S18).

As described above, in the first embodiment, the disk device 1 writes a plurality of data tracks in the band BN such that the data track pitch on the head side of the band BN is larger than other data track pitches in at least a part of the circumferential position range in the SMR method. As a result, an off-track slice larger than other data tracks can be applied to the data track on the head side to reduce the waiting time T1 of the settling processing, and the writing of the data track on the head of the band BN can be started while the residual vibration after seeking of the actuator arm 15 occurs, such that the write processing can be speeded up.

In the first embodiment, in each band BN, the disk device 1 can set the off-track slice WOS1 of the head data track DT_1 separately from the off-track slices WOS0 of the other data tracks DT_2 to DT_n-1 in the same band BN. As a result, it is possible to reduce the waiting time T1 of the settling processing by applying an off-track slice larger than other data tracks to the data track on the head side.

Note that, considering a case in which a shake amount of the residual vibration changes depending on a seek distance, the disk device 1 may be configured to be able to select execution or non-execution of a track arrangement in which the data track pitch PT of the head data track DT in the band BN is made larger than the other data track pitches PT according to the radial position of the band BN. For example, the disk device 1 may not perform the arrangement in the band BN (for example, band BN2) near the middle circumference of the disk 11 in which the maximum seek distance becomes half, and may perform the arrangement in other bands BN (for example, bands BN1 and BN3). As a result, it is possible to suppress the influence of the residual vibration while suppressing deterioration in data format efficiency, and to speed up the write processing.

Second Embodiment

Next, a disk device 1 according to a second embodiment will be described. Hereinafter, portions different from those of the first embodiment will be mainly described.

In the first embodiment, the track arrangement in which the radial position of the head data track DT of the target band BN is set to the center position of the servo track is exemplified, but in the second embodiment, the track arrangement in which the radial position of the head data track DT of the target band BN is shifted from the center position of the servo track is exemplified. Here, N is an integer of 2 or more. The data track pitch TP between the head data track DT_1 and the second data track DT_2 of the band BN can be "N+a decimal number less than 1" times the data track pitch TP between other data tracks in the same band BN. Alternatively, the data track pitch TP between the head data track DT_1 and the second data track DT_2 of the band BN can be "N−a decimal number less than 1" times the data track pitch TP between other data tracks in the same band BN.

Figure 7:
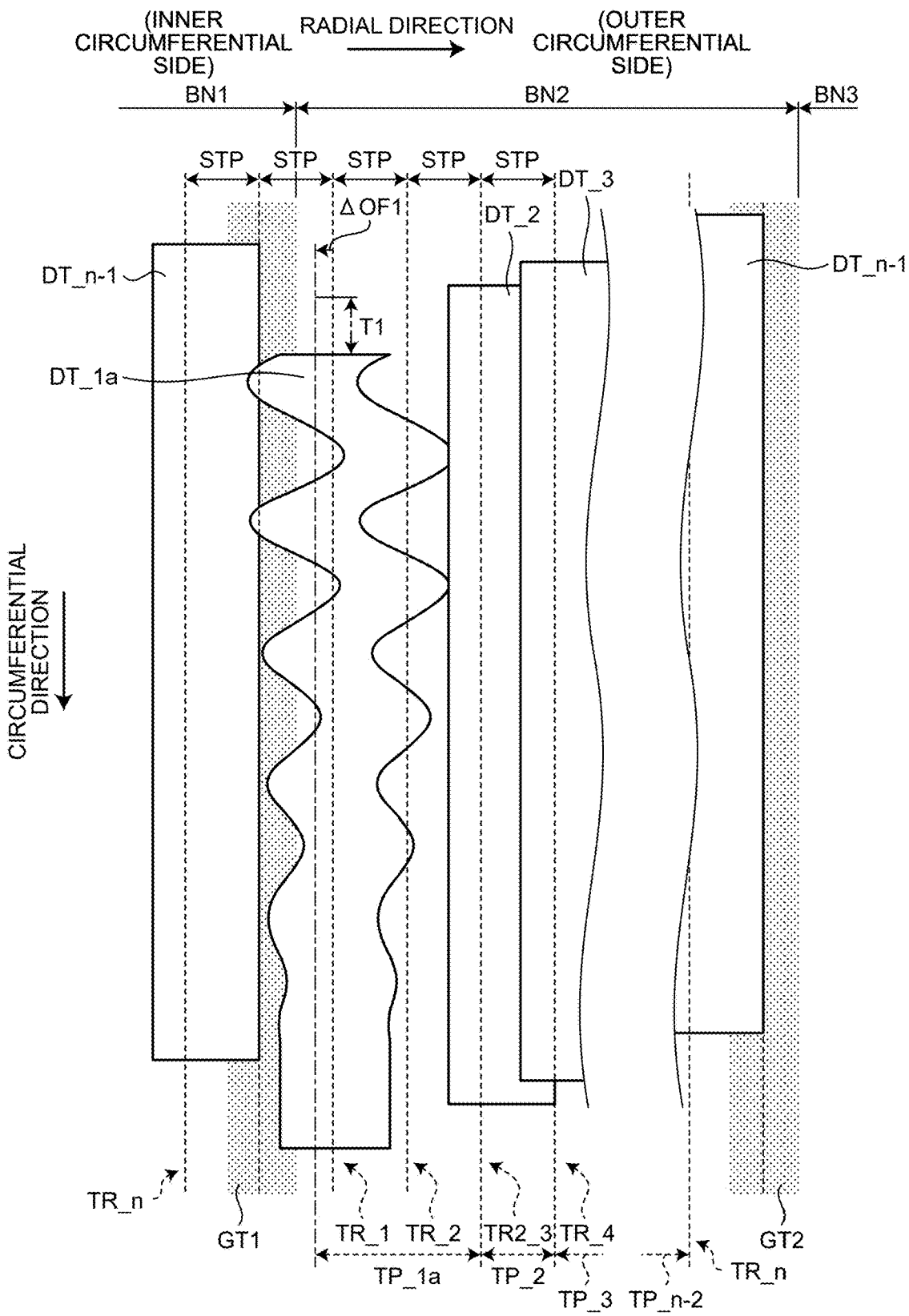
FIG. 7 is a diagram illustrating a configuration of a data track according to a second embodiment.

For example, it may be grasped that the amplitude of the residual vibration is asymmetrically generated with respect to the center position of the servo track as illustrated in FIG. 7 according to read error occurrence situations (Condition 1) to (Condition 3) described in the first embodiment. FIG. 7 is a diagram illustrating a configuration of the data track DT according to the second embodiment. FIG. 7 exemplifies control in which the radial position of a head data track DT_1a of the target band BN2 is offset from the center position of the servo track TR_1 toward the inner peripheral side by ΔOF1 according to the amplitude of the residual vibration being generated larger on the outer peripheral side than on the inner peripheral side with respect to the center position of the servo track.

Assuming that the inner peripheral side is defined as positive and the outer peripheral side is defined as negative, a center offset ΔOF=ΔOF1 (>0) is obtained in the case of FIG. 7. As a result, a data track pit TP 1a between the data tracks DT_1a and DT_2 in the target band BN2 can be made larger relative to the other data track pitches TP_2 to TP_n-2. As a result, since the write of the data track at the head of the band BN can be started while the asymmetric residual vibration occurs, the write processing can be speeded up.

Figure 8:
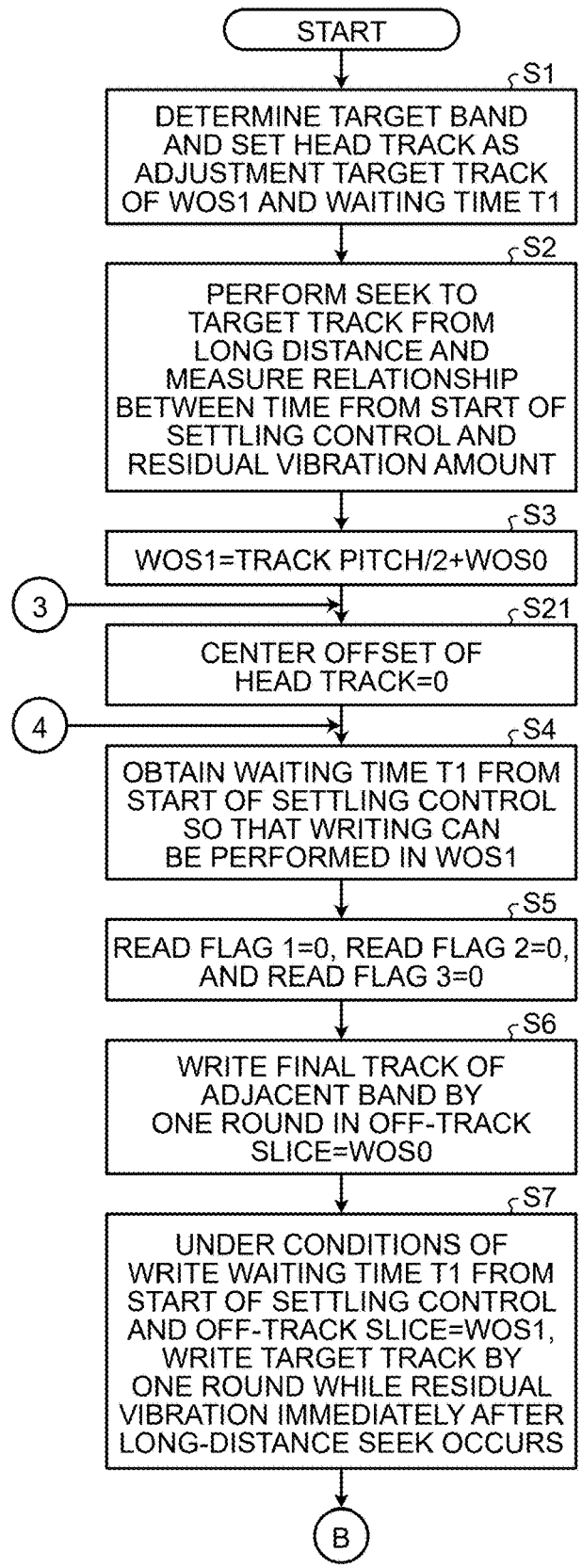
FIG. 8 is a flowchart illustrating an operation of the disk device according to the second embodiment.
Figure 9:
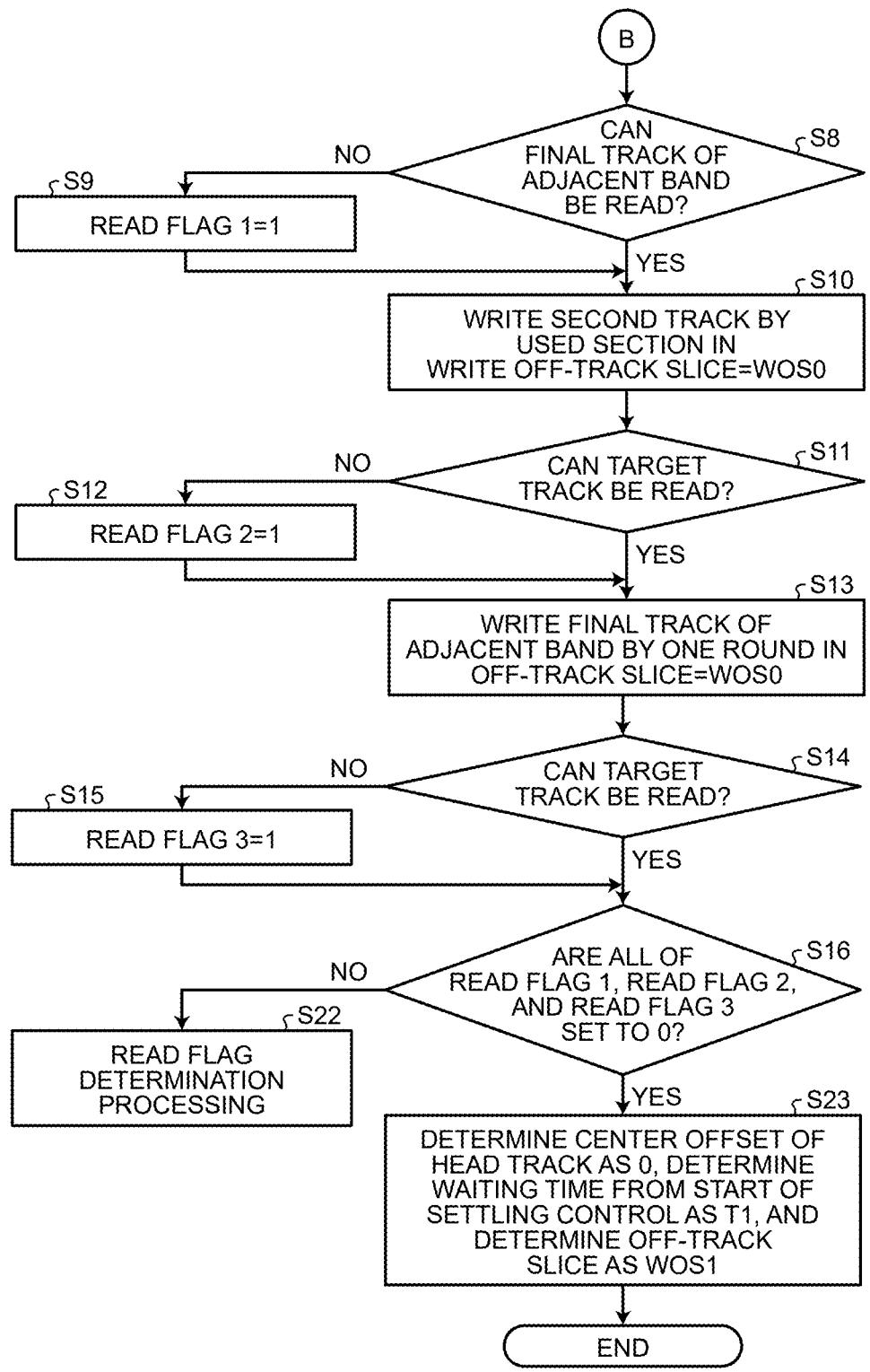
FIG. 9 is a flowchart illustrating the operation of the disk device according to the second embodiment.

The operation of the disk device 1 is different from that of the first embodiment in the following points, as illustrated in FIGS. 8 and 9. FIGS. 8 and 9 are flowcharts illustrating the operation of the disk device 1. The operation illustrated in FIGS. 8 and 9 can be mainly controlled by the controller 32.

After S1 to S3 are performed similarly to the first embodiment, the disk device 1 sets the initial value "0" to the center offset ΔOF for the head data track DT_1 (adjustment target track) (S21). Thereafter, S4 to S16 are performed similarly to the first embodiment.

When at least one read flag of the read flag 1, the read flag 2, and the read flag 3 is "1" (No in S16), the disk device 1 performs read flag determination processing to suppress data loss (S22). As illustrated in FIG. 10, the disk device 1 may determine whether to reduce the off-track slice WOS1 or to shift and write the center position of the head data track DT_1 according to a combination of values of the read flag 1, the read flag 2, and the read flag 3. FIG. 10 is a diagram illustrating the read flag determination processing.

For example, when (read flag 1, read flag 2, read flag 3)=(0, 1, 0), the disk device 1 sets ΔOF=ΔOF1 such that the center offset ΔOF of the head data track DT_1 is shifted toward the adjacent band BN by a predetermined amount ΔOF1, and returns the processing to S4. The predetermined amount ΔOF1 can be experimentally determined in advance as an amount suitable for finely adjusting the center offset ΔOF.

When (read flag 1, read flag 2, read flag 3)=(0, 0, 1), the disk device 1 sets ΔOF=−ΔOF1 such that the center offset ΔOF of the head data track DT_1 is shifted toward the second data track DT_2 by the predetermined amount ΔOF1, and returns the processing to S4.

When (read flag 1, read flag 2, read flag 3)=(0, 0, 1), the disk device 1 reduces the off-track slice WOS1 by a predetermined amount, and returns the processing to S21. The predetermined amount can be experimentally determined in advance as an amount suitable for finely adjusting the off-track slice.

When (read flag 1, read flag 2, read flag 3)=(1, 0, 0), the disk device 1 sets ΔOF=−ΔOF1 such that the center offset ΔOF of the head data track DT_1 is shifted toward the second data track DT_2 by the predetermined amount ΔOF1, and returns the processing to S4.

When (read flag 1, read flag 2, read flag 3)=(1, 1, 0), the disk device 1 reduces the off-track slice WOS1 by a predetermined amount, and returns the processing to S21.

When (read flag 1, read flag 2, read flag 3)=(1, 0, 1), the disk device 1 sets ΔOF=−OF1 such that the center offset ΔOF of the head data track DT_1 is shifted toward the second data track DT_2 by the predetermined amount ΔOF1, and returns the processing to S4.

When (read flag 1, read flag 2, read flag 3)=(1, 1, 1), the disk device 1 reduces the off-track slice WOS1 by a predetermined amount, and returns the processing to S21.

When all of the read flag 1, the read flag 2, and the read flag 3 are "0" (Yes in S16), the disk device 1 determines the center offset of the head data track DT_1 in the target band BN as 0, determines the waiting time from the start of the settling control as T1, and determines the off-track slice as WOS1 (S23).

As described above, in the second embodiment, in the SMR method, when the amplitude of the residual vibration is generated asymmetrically with respect to the center position of the servo track, the disk device 1 performs the track arrangement in which the radial position of the head data track DT of the target band BN is shifted from the center position of the servo track. As a result, since the write of the data track at the head of the band BN can be started while the residual vibration after seeking of the actuator arm 15 occurs asymmetrically, the write processing can be speeded up.

Note that, considering a case in which a shake amount of the residual vibration changes depending on a seek distance, the disk device 1 may be configured to be able to select execution or non-execution of a track arrangement in which the data track pitch PT of the head data track DT in the band BN is made larger than the other data track pitches PT according to the radial position of the band BN. For example, the disk device 1 may not perform the arrangement in the band BN (for example, band BN2) near the middle circumference of the disk 11 in which the maximum seek distance becomes half, and may perform the arrangement in other bands BN (for example, bands BN1 and BN3). As a result, it is possible to suppress the influence of the residual vibration while suppressing deterioration in data format efficiency, and to speed up the write processing.

Third Embodiment

Next, a disk device 1 according to a third embodiment will be described. Hereinafter, portions different from those of the first embodiment and the second embodiment will be mainly described.

In the first embodiment and the second embodiment, the track arrangement in which the data track pitch on the head side of the target band BN is wider than the other data track pitches over the entire circumference is exemplified, but in the third embodiment, the track arrangement in which the data track pitch on the head side is partially wider than the other data track pitches is exemplified.

Figure 11:
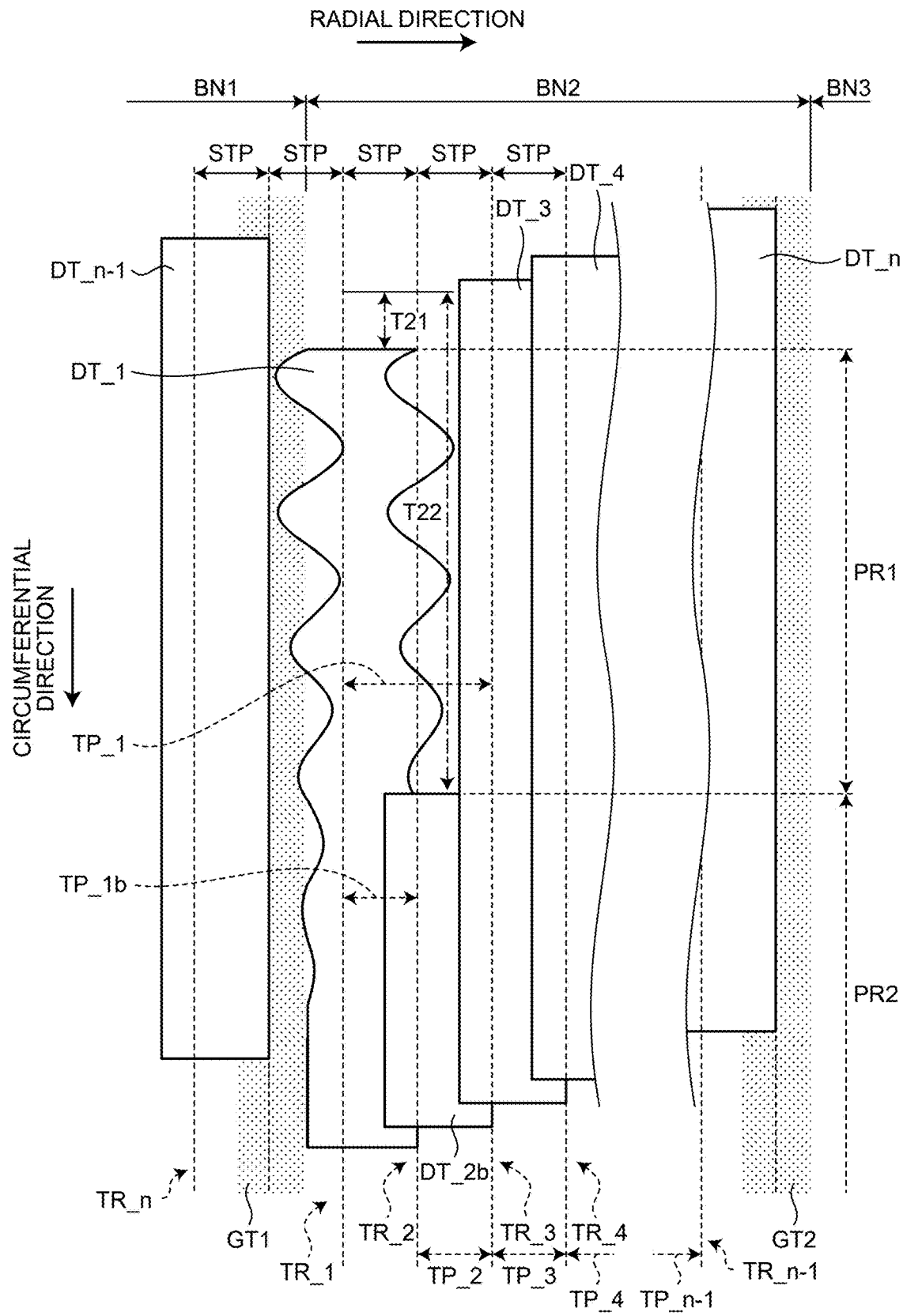
FIG. 11 is a diagram illustrating a configuration of a data track according to a third embodiment.

The residual vibration during a long distance seek may fall within an allowable range in the circumferential position range PR1 shorter than one round. For example, in the disk device 1 in which one rotation is 8.3 msec, the residual vibration may fall within the off-track slice in about 4 msec. Here, as illustrated in FIG. 11, with respect to a head data track DT_1 in the band BN, a third data track DT_3 is adjacent in the radial direction in the circumferential position range PR1, and a second data track DT_2 is adjacent in the radial direction in a subsequent circumferential position range PR2. FIG. 11 is a diagram illustrating a configuration of the data track DT according to the third embodiment. The configuration can be realized by writing the second data track DT_2 from the head not in the circumferential position range PR1 but in the subsequent circumferential position range PR2. As a result, a data track pitch TP_1 of the head data track DT_1 is larger than other data track pitches TP_2 to TP n-1 in the circumferential position range PR1, but can be equivalent to the other data track pitches TP_2 to TP n-1 in the circumferential position range PR2. As a result, the track pitch on the head side of the band BN in the circumferential position range PR1 becomes larger than the other track pitches, and the track pitch on the head side of the band BN in the circumferential position range PR2 becomes equivalent to the other track pitches.

Here, the head data track DT_1 is switched to use an off-track slice WOS2 for adjustment in the circumferential position range PR1 and use the standard off-track slice WOS0 similar to the other data tracks DT in the circumferential position range PR2. By the operation, it is possible to satisfy WOS2>WOS0, deterioration in data format efficiency can be suppressed, and the head data track DT_1 can be written during the generation of the residual vibration, such that the write processing can be speeded up.

The off-track slice WOS2 assuming the residual vibration is determined to satisfy the following (Condition 4) to (Condition 6).

(Condition 4) When the head data track DT_1 is written, the last data track DT_n-1 of the adjacent band BN can be read even when there is shake writing on the last data track DT_n-1 of the adjacent band BN.

(Condition 5) When the second data track DT_2b and the third data track DT_3 in the band BN are written, the head data track DT_1 is not erased, and the head data track DT_1 can be read.

(Condition 6) When the last data track DT_n-1 of the adjacent band BN is written, the head data track DT_1 of the band BN can be read even when there is shake writing on the head data track DT_1 of the band BN.

In the third embodiment, the maximum value of the off-track slice WOS2 is $$STP/2+WOS0,$$

but when (Condition 4) to (Condition 6) are not satisfied with the maximum value of the off-track slice WOS2, the value of the off-track slice WOS2 is reduced.

Figure 12:
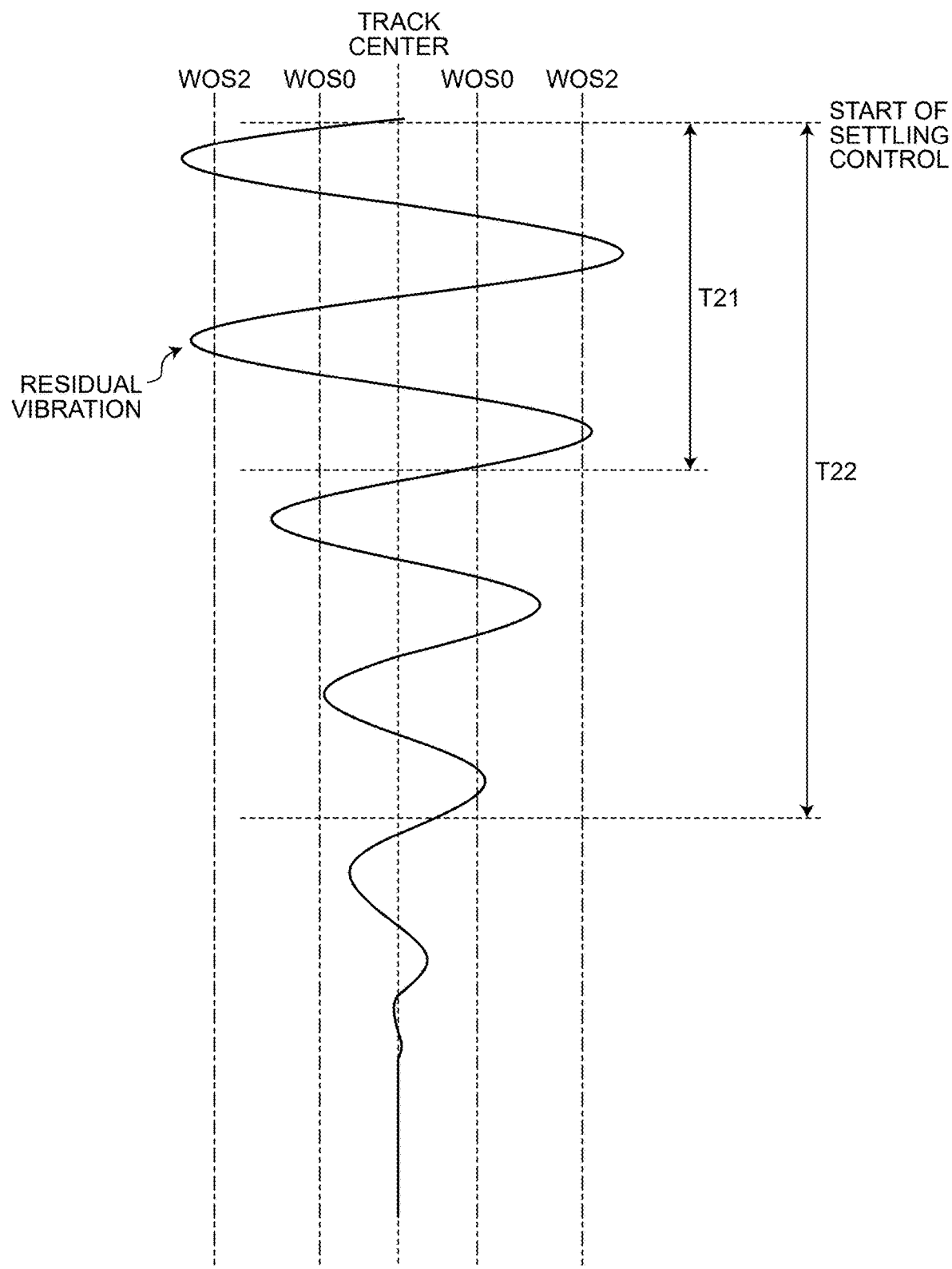
FIG. 12 is a diagram illustrating a waiting time in the third embodiment.

For the head data track DT_1, the off-track slice WOS2 is used in the circumferential position range PR1, and the off-track slice is switched from WOS2 to WOS0 at the start of the circumferential position range PR2. Therefore, as illustrated in FIG. 12, the disk device 1 performs control using a waiting time T21 for the off-track slice WOS2 and a waiting time T22 for the off-track slice WOS0. The waiting time T21 is a time from the start of the settling processing until the residual vibration falls within the off-track slice WOS2 and the settling processing is completed. The waiting time T22 is a time from the start of the settling processing until the residual vibration falls within the off-track slice WOS0 and the settling processing is completed.

Figure 13:
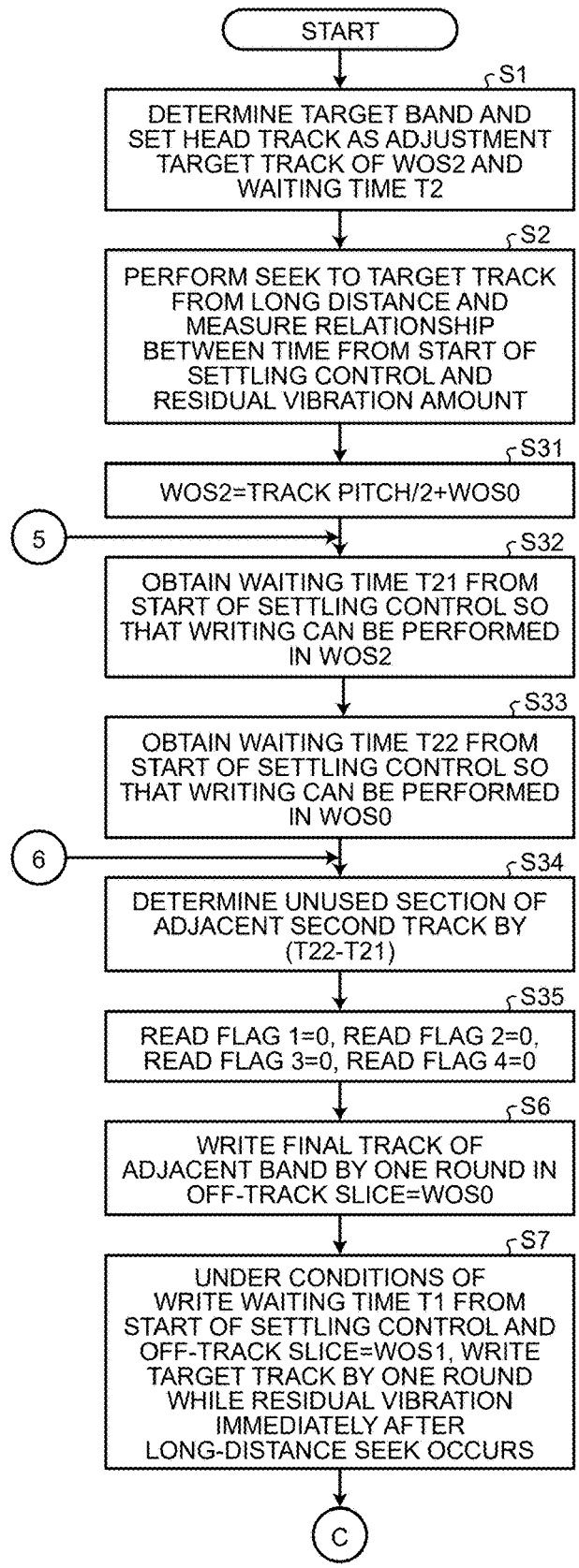
FIG. 13 is a flowchart illustrating an operation of a disk device according to the third embodiment.
Figure 14:
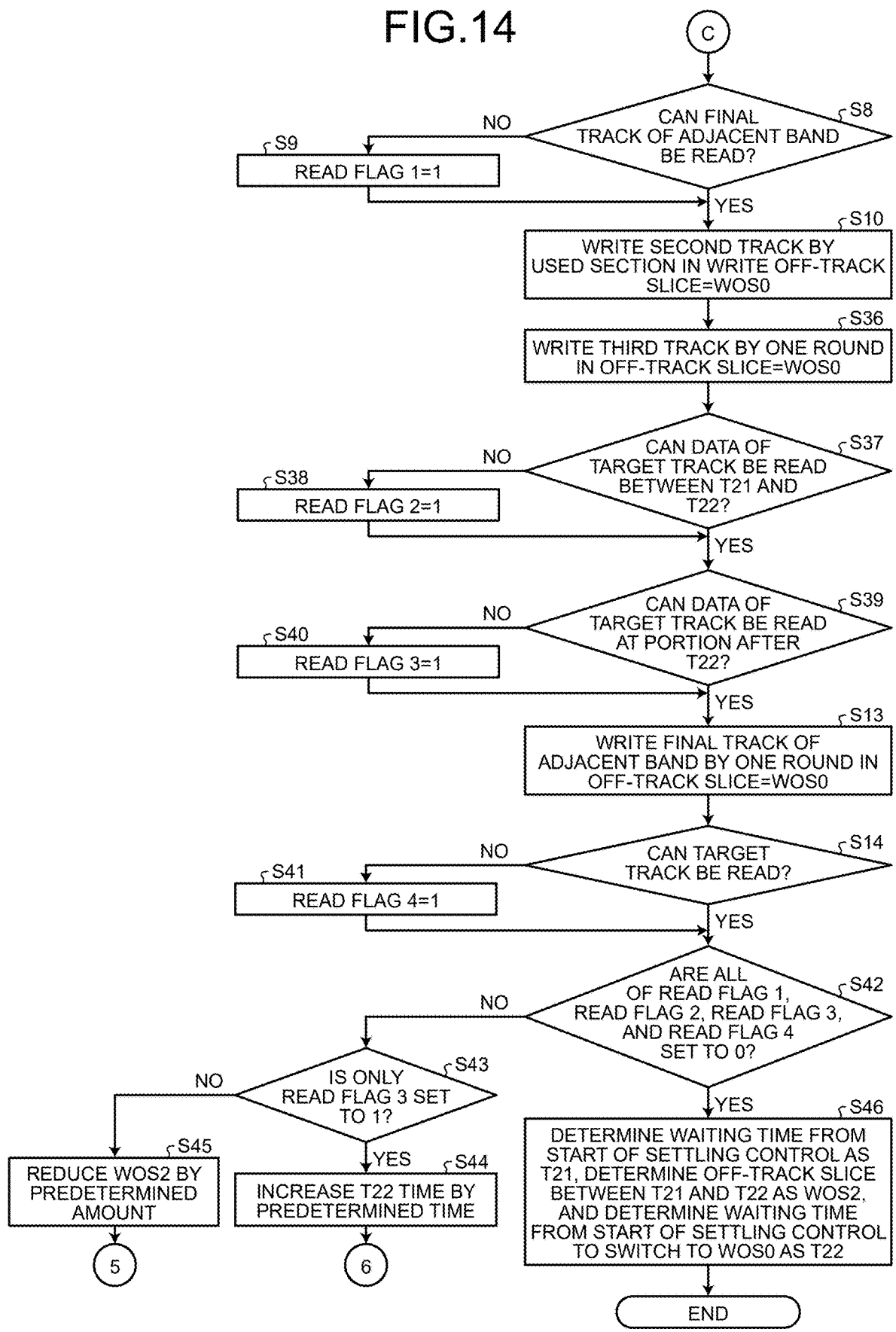
FIG. 14 is a flowchart illustrating the operation of the disk device according to the third embodiment.

The operation of the disk device 1 is different from that of the first embodiment in the following points as illustrated in FIGS. 13 and 14. FIGS. 13 and 14 are flowcharts illustrating the operation of the disk device 1. The operation illustrated in FIGS. 13 and 14 can be mainly controlled by the controller 32.

After S1 and S2 are performed similarly to the first embodiment, the disk device 1 obtains the off-track slice WOS1 for adjustment by the following Formula 2 using the servo track pitch STP and the standard off-track slice WOS0 (S31).

$$WOS2 = STP/2 + WOS0 \qquad \text{Formula 2}$$

The disk device 1 obtains the waiting time T21 from the start of the settling control such that writing can be performed in the off-track slice WOS2 (S32).

The disk device 1 obtains the waiting time T22 from the start of the settling control such that writing can be performed in the off-track slice WOS0 (S33).

The disk device 1 determines the circumferential position range PR1, that is the unused section of the second adjacent data track DT_2, by (T22-T21) (S34).

The disk device 1 sets an initial value to each read flag. The disk device 1 sets a read flag 1=0, a read flag 2=0, a read flag 3=0, and a read flag 4=0 (S35). Thereafter, S6 to S10 are performed similarly to the first embodiment.

The disk device 1 writes the third data track DT_3 of the band BN by one round in the off-track slice WOS0 (S36).

The disk device 1 determines whether the adjustment target track (data track DT_1) can be read in the circumferential position range PR1 between T21 and T22 (S37). When the adjustment target track cannot be read (No in S37), the disk device 1 sets "1" to the read flag 2 (S38).

When the adjustment target track can be read (Yes in S37), the disk device 1 skips S38.

The disk device 1 determines whether the adjustment target track can be read in the circumferential position range PR2 after T22 (S39). When the adjustment target track cannot be read (No in S39), the disk device 1 sets "1" to the read flag 3 (S40).

When the adjustment target track can be read (Yes in S39), the disk device 1 skips S40. Thereafter, S13 to S14 are performed similarly to the first embodiment.

When the adjustment target track cannot be read (No in S14), the disk device 1 sets "1" to the read flag 4 (S41).

When the adjustment target track can be read (Yes in S14), the disk device 1 skips S41.

The disk device 1 determines whether all of the read flag 1, the read flag 2, the read flag 3, and the read flag 4 are "0" (S42). When at least one read flag of the read flag 1, the read flag 2, the read flag 3, and the read flag 4 is "1" (No in S42), the disk device 1 determines whether only the read flag 3 is "1" (S43).

When only the read flag 3 is "1" (Yes in S43), the disk device 1 determines that the waiting time T22 is insufficient, increases the waiting time T22 by a predetermined time (S44), and returns the processing to S34. The predetermined time can be experimentally determined in advance as a time suitable for finely adjusting the waiting time T22.

When there is "1" other than the read flag 3 (No in S43), the disk device 1 reduces the off-track slice WOS2 by a predetermined amount to suppress data loss (S45), and returns the processing to S32. The predetermined amount can be experimentally determined in advance as an amount suitable for finely adjusting the off-track slice.

When all of the read flag 1, the read flag 2, the read flag 3, and the read flag 4 are "0" (Yes in S42), the disk device 1 determines the waiting time from the start of the settling control as T21, determines the write off-track slice in the circumferential position range PR1 between T21 and T22 as WOS2, and determines the waiting time from the start of the settling control for switching the write off-track slice to WOS0 as T22 (S46).

As described above, in the third embodiment, the disk device 1 performs control using the SMR method such that the data track pitch on the head side is partially wider than the other data track pitches. The disk device 1 makes the data track pitch on the head side of the band BN wider the other data track pitches in the circumferential position range PR1, but equivalentizes the data track pitch on the head side with the other data track pitches in the circumferential position range PR2. As a result, in the circumferential position range PR1, the off-track slice larger than the other data tracks can be applied to the data track on the head side, the waiting time T1 of the settling processing can be reduced, and the number of data tracks can be secured in the circumferential position range PR2. Therefore, the write processing can be speeded up, and deterioration in data format efficiency can be suppressed.

Note that, considering a case in which a shake amount of the residual vibration changes depending on a seek distance, the disk device 1 may be configured to be able to select execution or non-execution of a track arrangement in which the data track pitch on the head side is partially wider than other data track pitches. For example, the disk device 1 may not perform the arrangement in the band BN (for example, band BN2) near the middle circumference of the disk 11 in which the maximum seek distance becomes half, and may perform the arrangement in other bands BN (for example, bands BN1 and BN3). As a result, it is possible to suppress the influence of the residual vibration while further suppressing deterioration in data format efficiency, and to speed up the write processing.

Fourth Embodiment

Next, a disk device 1 according to a fourth embodiment will be described. Hereinafter, portions different from those of the first to third embodiments will be mainly described.

In the fourth embodiment, the second embodiment and the third embodiment are combined. In the fourth embodiment, a track arrangement in which the radial position of the head data track DT of the target band BN is shifted from the center position of the servo track, that is, a track arrangement in which the data track pitch on the head side is partially wider than other data track pitches is exemplified.

Figure 15:
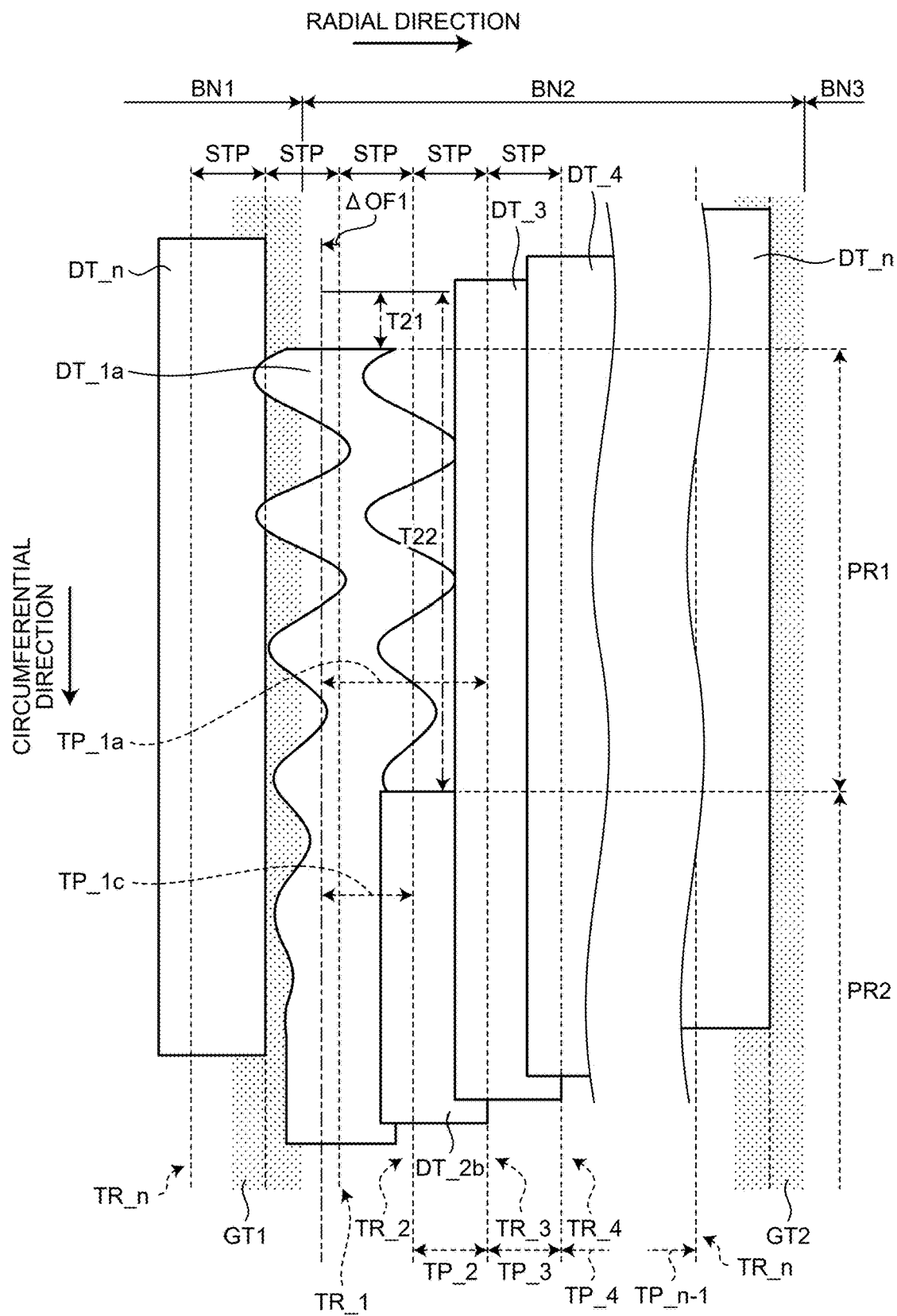
FIG. 15 is a diagram illustrating a configuration of a data track according to a fourth embodiment.

For example, it may be grasped that the amplitude of the residual vibration is asymmetrically generated with respect to the center position of the servo track as illustrated in FIG. 15 according to read error occurrence situations (Condition 4) to (Condition 6) described in the third embodiment. FIG. 15 is a diagram illustrating a configuration of the data track DT according to the third embodiment. FIG. 15 exemplifies control in which the radial position of the head data track DT_1a of the target band BN2 is offset from the center position of the servo track TR_1 toward the inner peripheral side by ΔOF1 according to the amplitude of the residual vibration being generated larger on the outer peripheral side than on the inner peripheral side with respect to the center position of the servo track. Here, in the circumferential position range PR1, the data track pitch TP_1a between the head data track DT_1 and the third data track DT_3 of the band BN can be "2+a decimal number less than 1" times the data track pitch TP between the other data tracks in the same band BN. In the circumferential position range PR2, a data track pitch TP_1c between the head data track DT_1 and the second data track DT_2 of the band BN can be "1+a decimal number less than 1" times the data track pitch TP between the other data tracks in the same band BN.

Figure 16:
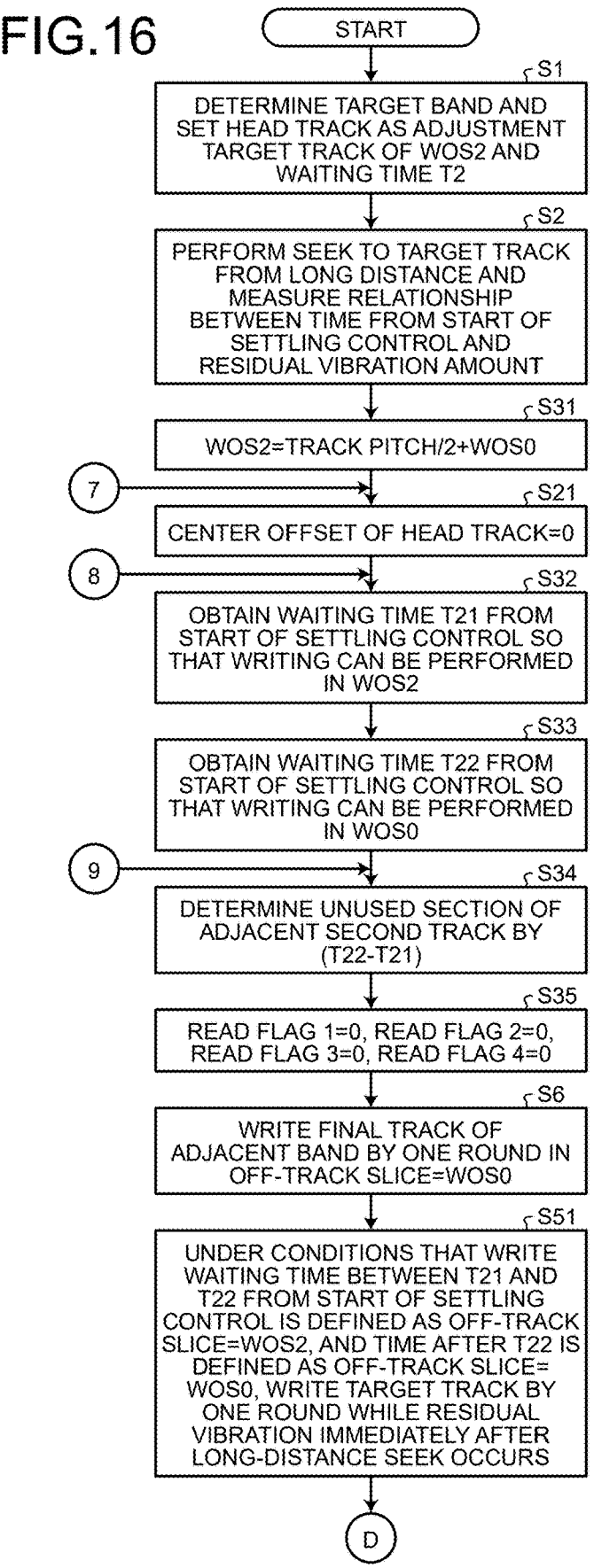
FIG. 16 is a flowchart illustrating an operation of a disk device according to the fourth embodiment.
Figure 17:
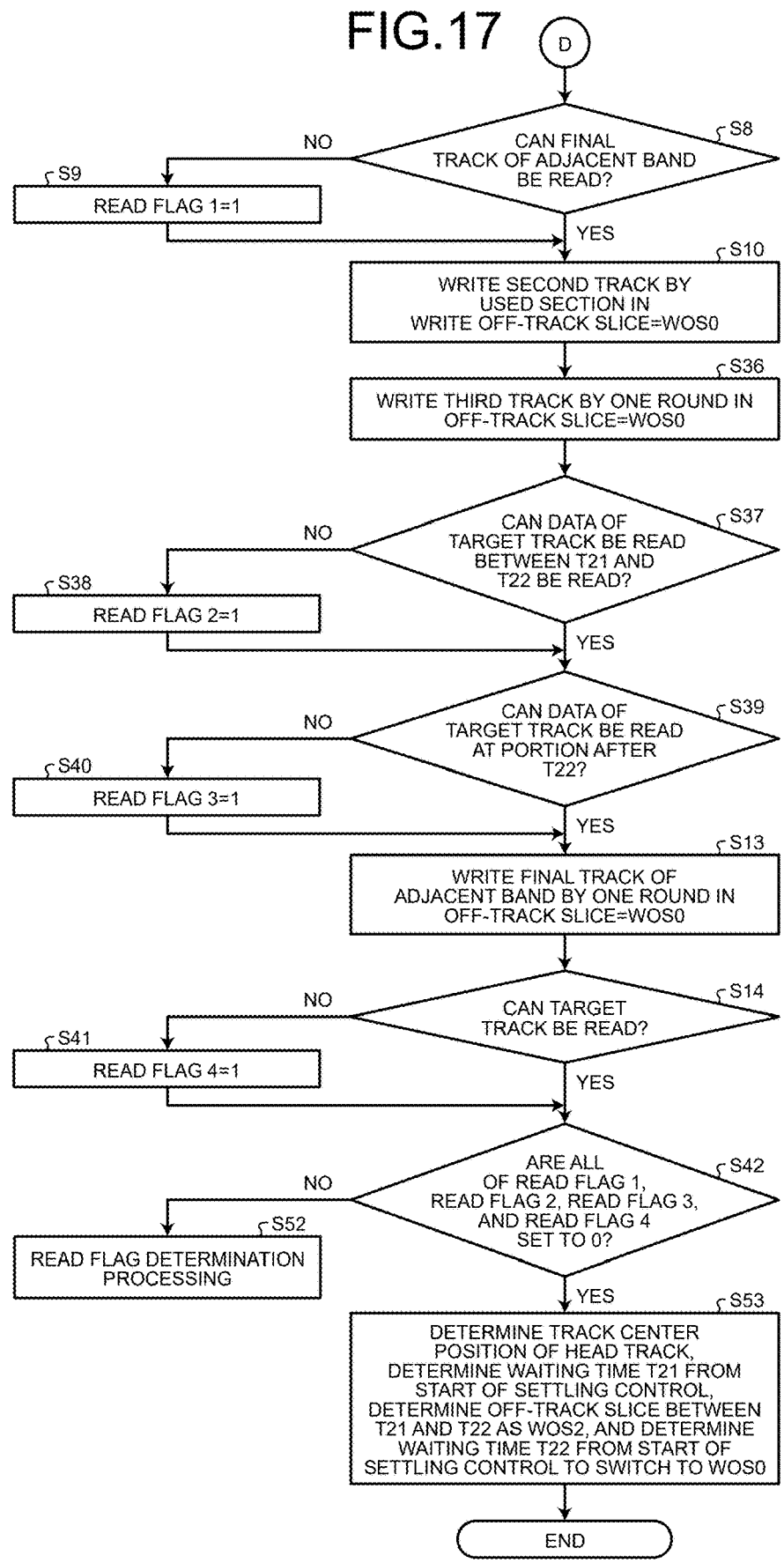
FIG. 17 is a flowchart illustrating the operation of the disk device according to the fourth embodiment.

The operation of the disk device 1 is different from that of the third embodiment in the following points, as illustrated in FIGS. 16 and 17. FIGS. 16 and 17 are flowcharts illustrating the operation of the disk device 1. The operation illustrated in FIGS. 16 and 17 can be mainly controlled by the controller 32.

After S1 to S6 are performed similarly to the third embodiment, the disk device 1 sets the off-track slice to WOS2 during the waiting time T21 and T22 from the start of the settling control (that is, the circumferential position range PR1), sets the off-track slice to WOS0 after T22 (that is, the circumferential position range PR2), and performs the write operation by one round to the target track while the residual vibration immediately after the long distance seek occurs (S51). Thereafter, S8 to S42 are performed similarly to the third embodiment.

When at least one read flag of the read flag 1, the read flag 2, the read flag 3, and the read flag 4 is "1" (No in S42), the disk device 1 performs read flag determination processing to suppress data loss (S22). As illustrated in FIG. 18, the disk device 1 may determine whether to increase the waiting time T22 of the settling processing, reduce the off-track slice WOS1, or shift the center position of the head data track DT_1 and perform writing depending on a combination of the values of the read flag 1, the read flag 2, the read flag 3, and the read flag 4. FIG. 18 is a diagram illustrating the read flag determination processing.

For example, when (read flag 1, read flag 2, read flag 3, read flag 4)=(0, 0, 1, 0), the disk device 1 sets the waiting time T22 to increase the waiting time T22 of the settling processing by a predetermined amount, and returns the processing to S34. The predetermined amount can be experimentally determined in advance as an amount suitable for finely adjusting the waiting time T22.

When (read flag 1, read flag 2, read flag 3, read flag 4)=(0, 0, 0, 1), the disk device 1 sets $\Delta OF = -\Delta OF1$ such that the center offset $\Delta OF$ of the head data track DT_1 is shifted toward the second data track DT_2 by a predetermined amount $\Delta OF1$, and returns the processing to S32. The predetermined amount $\Delta OF1$ can be experimentally determined in advance as an amount suitable for finely adjusting the center offset $\Delta OF$.

When (read flag 1, read flag 2, read flag 3, read flag 4)=(0, 0, 1, 1), the disk device 1 reduces the off-track slice WOS2 by a predetermined amount, and returns the processing to S21. The predetermined amount can be experimentally determined in advance as an amount suitable for finely adjusting the off-track slice.

When (read flag 1, read flag 2, read flag 3, read flag 4)=(0, 1, 0, 0), the disk device 1 sets $\Delta OF = \Delta OF1$ such that the center offset $\Delta OF$ of the head data track DT_1 is shifted toward the adjacent band BN by the predetermined amount $\Delta OF1$, and returns the processing to S32.

When (read flag 1, read flag 2, read flag 3, read flag 4)=(0, 1, 1, 0), the disk device 1 sets $\Delta OF = \Delta OF1$ such that the center offset $\Delta OF$ of the head data track DT_1 is shifted toward the adjacent band BN by the predetermined amount $\Delta OF1$, and returns the processing to S32.

When (read flag 1, read flag 2, read flag 3, read flag 4)=(0, 1, 0, 1), the disk device 1 reduces the off-track slice WOS2 by the predetermined amount, and returns the processing to S21.

When (read flag 1, read flag 2, read flag 3, read flag 4)=(0, 1, 1, 1), the disk device 1 reduces the off-track slice WOS2 by the predetermined amount, and returns the processing to S21.

When (read flag 1, read flag 2, read flag 3, read flag 4)=(1, 0, 0, 0), the disk device 1 sets $\Delta OF = -\Delta OF1$ such that the center offset $\Delta OF$ of the head data track DT_1 is shifted toward the second data track DT_2 by the predetermined amount $\Delta OF1$, and returns the processing to S32.

When (read flag 1, read flag 2, read flag 3, read flag 4)=(1, 0, 1, 0), the disk device 1 reduces the off-track slice WOS2 by the predetermined amount, and returns the processing to S21.

When (read flag 1, read flag 2, read flag 3, read flag 4)=(1, 0, 0, 1), the disk device 1 sets $\Delta OF = -\Delta OF1$ such that the center offset $\Delta OF$ of the head data track DT_1 is shifted toward the second data track DT_2 by the predetermined amount OF1, and returns the processing to S32.

When (read flag 1, read flag 2, read flag 3, read flag 4)=(1, 0, 1, 1), the disk device 1 reduces the off-track slice WOS2 by the predetermined amount, and returns the processing to S21.

When (read flag 1, read flag 2, read flag 3, read flag 4)=(1, 1, 0, 0), the disk device 1 reduces the off-track slice WOS2 by the predetermined amount, and returns the processing to S21.

When (read flag 1, read flag 2, read flag 3, read flag 4)=(1, 1, 1, 0), the disk device 1 reduces the off-track slice WOS2 by the predetermined amount, and returns the processing to S21.

When (read flag 1, read flag 2, read flag 3, read flag 4)=(1, 1, 0, 1), the disk device 1 reduces the off-track slice WOS2 by the predetermined amount, and returns the processing to S21.

When (read flag 1, read flag 2, read flag 3, read flag 4)=(1, 1, 1, 1), the disk device 1 reduces the off-track slice WOS2 by the predetermined amount, and returns the processing to S21.

When all of the read flag 1, the read flag 2, the read flag 3, and the read flag 4 are "0" (Yes in S43), the disk device 1 confirms the track center position of the head data track DT_1, determines the waiting time from the start of the settling control as T21, determines the write off-track slice in the interval from T21 and T22 as WOS2, and determines the waiting time from the start of the settling control for switching to WOS0 as T22 (S53).

As described above, in the fourth embodiment, in the SMR method, when the amplitude of the residual vibration is generated asymmetrically with respect to the center position of the servo track, the disk device 1 performs the track arrangement in which the radial position of the head data track DT of the target band BN is shifted from the center position of the servo track. As a result, since the write of the data track at the head of the band BN can be started while the residual vibration after seeking of the actuator arm 15 occurs asymmetrically, the write processing can be speeded up.

Further, in the fourth embodiment, the disk device 1 performs control using the SMR method such that the data track pitch on the head side is partially wider than the other data track pitches. The disk device 1 makes the data track pitch on the head side of the band BN wider than the other data track pitches in the circumferential position range PR1 (for example, set to "2+a decimal number less than 1" times), and makes the data track pitch on the head side substantially equivalent to the other data track pitches in the circumferential position range PR2 (for example, set to "1+a decimal number less than 1"). As a result, in the circumferential position range PR1, the off-track slice larger than the other data tracks can be applied to the data track on the head side, the waiting time T1 of the settling processing can be reduced, and the number of data tracks can be secured in the circumferential position range PR2. Therefore, the write processing can be speeded up, and deterioration in data format efficiency can be suppressed.

Fifth Embodiment

Next, a disk device 1 according to a fifth embodiment will be described. Hereinafter, portions different from those of the first to fourth embodiments will be mainly described.

In the first embodiment, a track arrangement in which the data track corresponding to the second servo track is omitted to widen the data track pitch on the head side is exemplified, but in the fifth embodiment, a track arrangement in which the data track pitch on the head side is widened by writing the data track on the head side to be close to the adjacent band side is exemplified.

Figure 19:
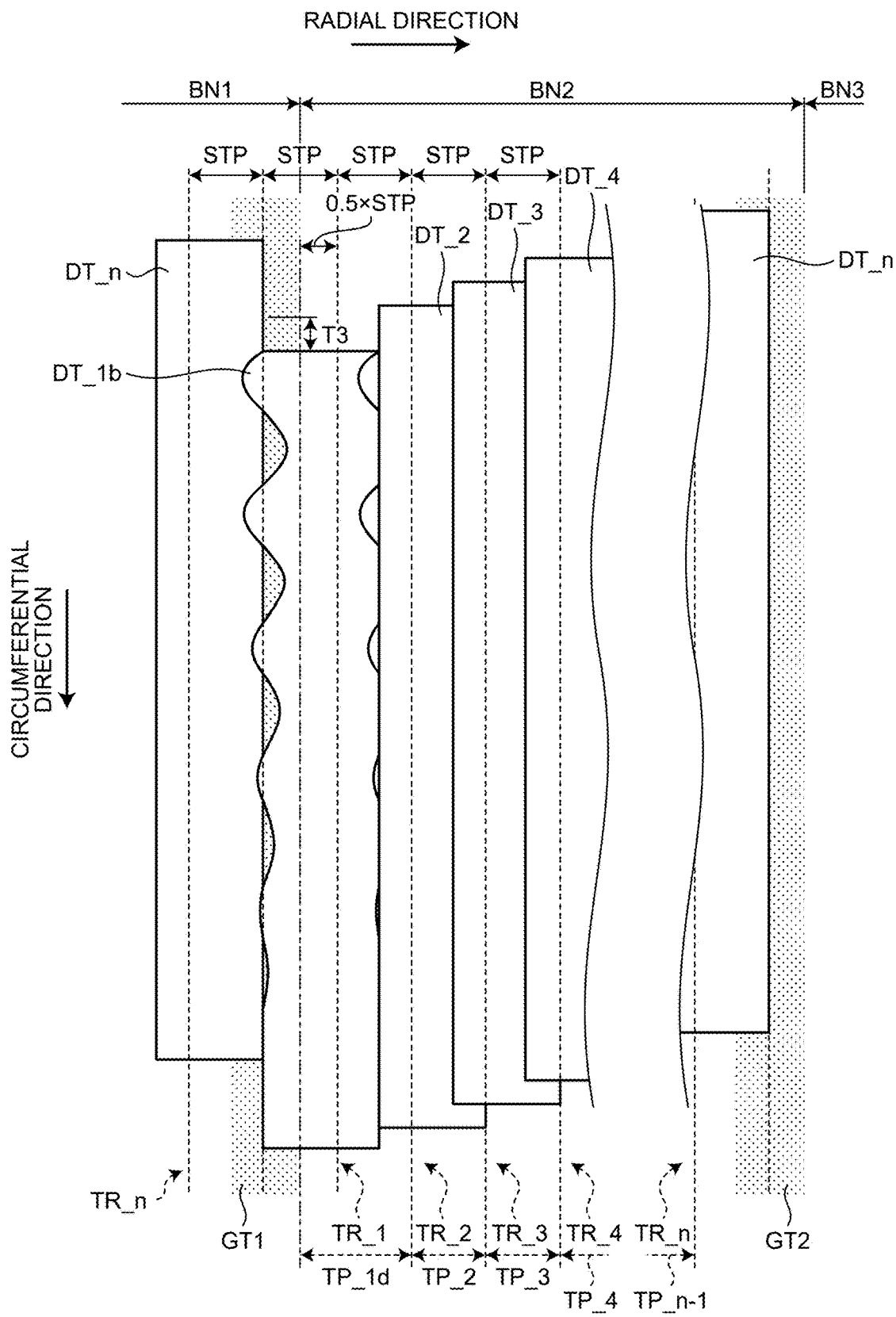
FIG. 19 is a diagram illustrating a configuration of a data track according to a fifth embodiment.

For example, as illustrated in FIG. 19, writing is performed by offsetting the head data track DT_1b of the band BN to the side of the last data track DT n of the adjacent band BN by 0.5 servo track pitches, and a track arrangement is set such that a data track pitch TP_1d between the head data track DT_1 and the second data track is wider than the other data track pitches TP_2 to TP_n-1. Here, the data track pitch TP_1d between the head data track DT_1 and the second data track DT_2 of the band BN can be "1+a decimal number less than 1" times the data track pitch TP between the other data tracks in the same band BN.

In the fifth embodiment, writing is performed with the head data track DT closer to the adjacent band BN side, and after the second data track DT_2, writing is performed with the standard data track pitch TP. Therefore, the number of data tracks DT in the band BN can be secured, and data format efficiency can be improved.

The fifth embodiment can be realized when the residual vibration is small and it is not necessary to make the data track pitch on the head side wider than the other data track pitches by an amount corresponding to one servo track as in the first to fourth embodiments.

When the off-track slice of the head data track DT_1 is defined as WOS3 and the standard off-track slice is defined as WOS0, it is possible to satisfy WOS3>WOS0. As a result, the head data track can be written during the residual vibration, and the write processing speed can be improved.

The off-track slice WOS3 is determined to satisfy the following (Condition 7) to (Condition 9).

(Condition 7) When the head data track DT_1 is written, the last data track DT n of the adjacent band BN can be read even when there is shake writing on the last data track DT n of the adjacent band BN.

(Condition 8) When the second data track DT_2 is written, the head data track DT_1 is not erased, and the head data track DT_1 can be read.

(Condition 9) When the last data track DT n of the adjacent band BN is written, the head data track DT_1 of the band BN can be read even when there is shake writing on the head data track DT_1 of the band BN.

In the fifth embodiment, the maximum value of the off-track slice WOS3 is

STP/4+WOS0, but when (Condition 7) to (Condition 9) are not satisfied with the maximum value of the off-track slice WOS3, the value of the off-track slice WOS3 is reduced. In addition, the waiting time of the settling processing for the off-track slice WOS3 is defined as T3.

Figure 20:
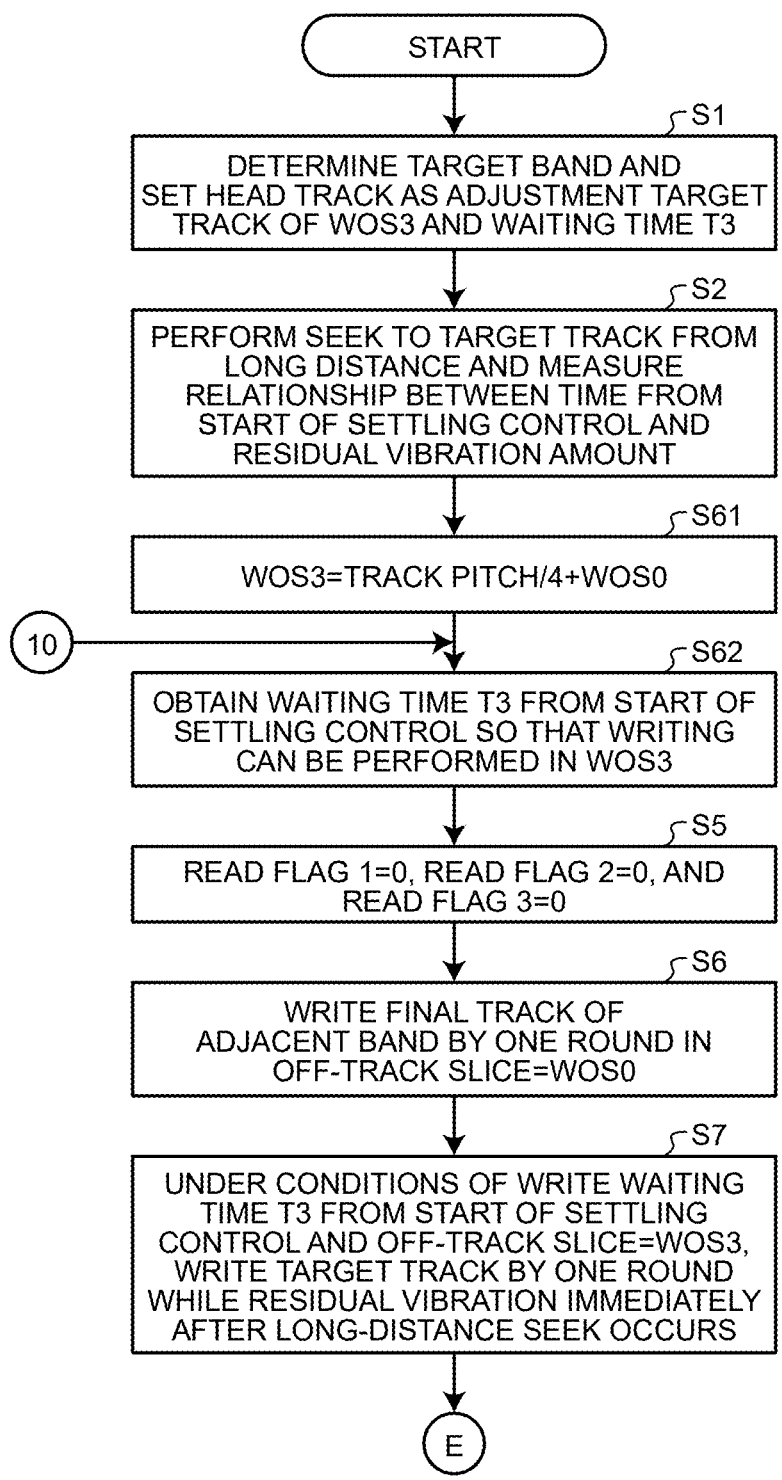
FIG. 20 is a flowchart illustrating an operation of a disk device according to the fifth embodiment.
Figure 21:
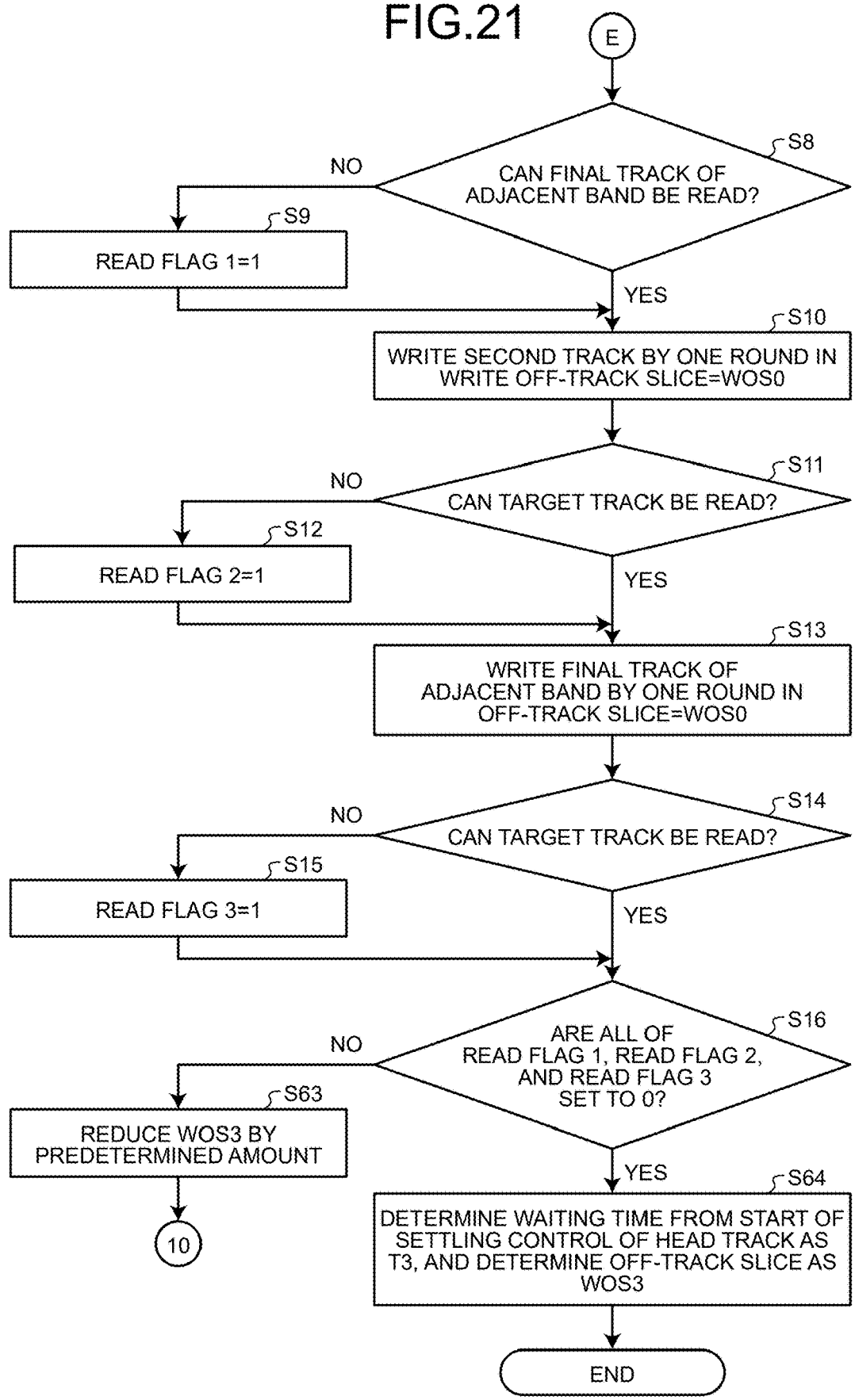
FIG. 21 is a flowchart illustrating the operation of the disk device according to the fifth embodiment.

The operation of the disk device 1 is different from that of the first embodiment in the following points, as illustrated in FIGS. 20 and 21. FIGS. 20 and 21 are flowcharts illustrating the operation of the disk device 1.

The operation illustrated in FIGS. 20 and 21 can be mainly controlled by the controller 32.

After S1 and S2 are performed similarly to the first embodiment, the disk device 1 obtains the off-track slice WOS3 for adjustment by the following Formula 3 using the servo track pitch STP and the standard off-track slice WOS0 (S61).

$$WOS3 = STP/2 + WOS0 \qquad \text{Formula 3}$$

The disk device 1 obtains the waiting time T3 from the start of the settling control such that writing can be performed in the off-track slice WOS3 (S62). Thereafter, S5 to S16 are performed similarly to the first embodiment.

When at least one read flag of the read flag 1, the read flag 2, and the read flag 3 is "1" (No in S16), the disk device 1 reduces the off-track slice WOS3 by a predetermined amount (S63) to suppress data loss, and returns the processing to S62. The predetermined amount can be experimentally determined in advance as an amount suitable for finely adjusting the off-track slice.

When all of the read flag 1, the read flag 2, and the read flag 3 are "0" (Yes in S16), the disk device 1 determines the center offset of the head data track DT_1 in the target band BN as 0.5×STP, determines the waiting time from the start of the settling control as T1, and determines the off-track slice as WOS3 (S64).

As described above, in the fifth embodiment, the disk device 1 performs a track arrangement in which the data track pitch on the head side is widened by writing the data track on the head side in the band BN to be close to the adjacent band side in the SMR method. As a result, an off-track slice larger than other data tracks can be applied to the data track on the head side to reduce the waiting time T3 of the settling processing, and the writing of the data track on the head of the band BN can be started while the residual vibration after seeking of the actuator arm 15 occurs, such that the write processing can be speeded up.

Note that, considering a case in which a shake amount of the residual vibration changes depending on a seek distance, the disk device 1 may be configured to be able to select execution or non-execution of a track arrangement in which the data track pitch on the head side is widened by writing the data track on the head in the band BN to be close to the adjacent band side according to the radial position of the band BN. For example, the disk device 1 may not perform the arrangement in the band BN (for example, band BN2) near the middle circumference of the disk 11 in which the maximum seek distance becomes half, and may perform the arrangement in other bands BN (for example, bands BN1 and BN3). As a result, it is possible to suppress the influence of the residual vibration while suppressing deterioration in data format efficiency, and to speed up the write processing.

Sixth Embodiment

Next, a disk device 1 according to a sixth embodiment will be described. Hereinafter, portions different from those of the first to fifth embodiments will be mainly described.

In the sixth embodiment, the second embodiment and the fifth embodiment are combined. In the sixth embodiment, a track arrangement in which the radial position of the head data track DT of the target band BN is further shifted from the position closer to the adjacent band BN side with respect to the center position of the servo track is exemplified.

Figure 22:
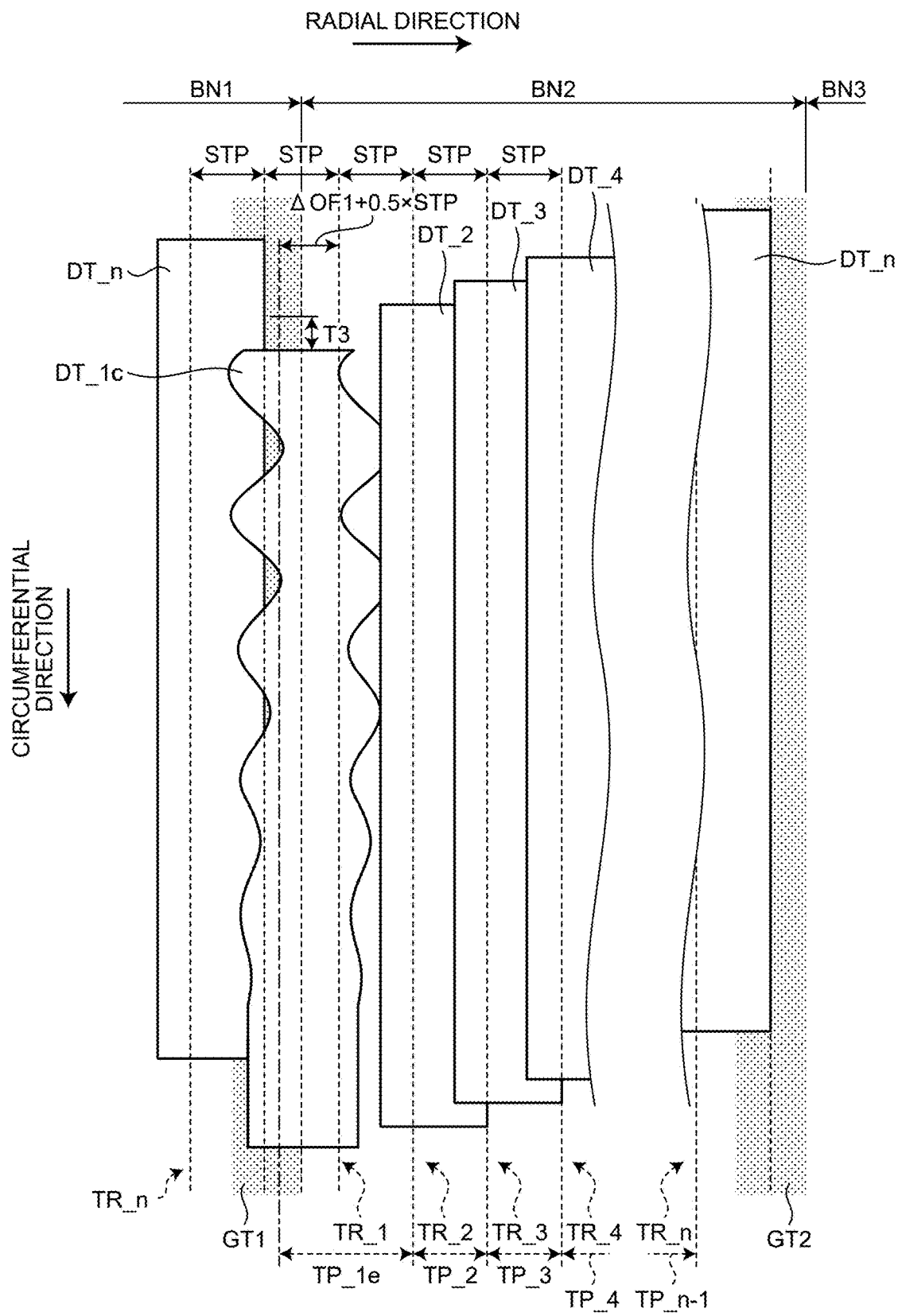
FIG. 22 is a diagram illustrating a configuration of a data track according to a sixth embodiment.

For example, it may be grasped that the amplitude of the residual vibration is asymmetrically generated with respect to a position closer to the adjacent band BN side from the center position of the servo track as illustrated in FIG. 22 according to read error occurrence situations (Condition 7) to (Condition 9) described in the fifth embodiment. FIG. 22 is a diagram illustrating a configuration of the data track DT according to the sixth embodiment. FIG. 22 exemplifies control in which the radial position of a head data track DT_1c of the target band BN2 is offset toward the inner circumferential side by ΔOF1 with respect to the position shifted by 0.5 servo tracks from the center position of the servo track TR_1 toward the adjacent band BN according to the amplitude of the residual vibration being generated larger on the outer circumferential side than on the inner circumferential side with respect to the position shifted from the center position of the servo track toward the adjacent band BN.

Figure 23:
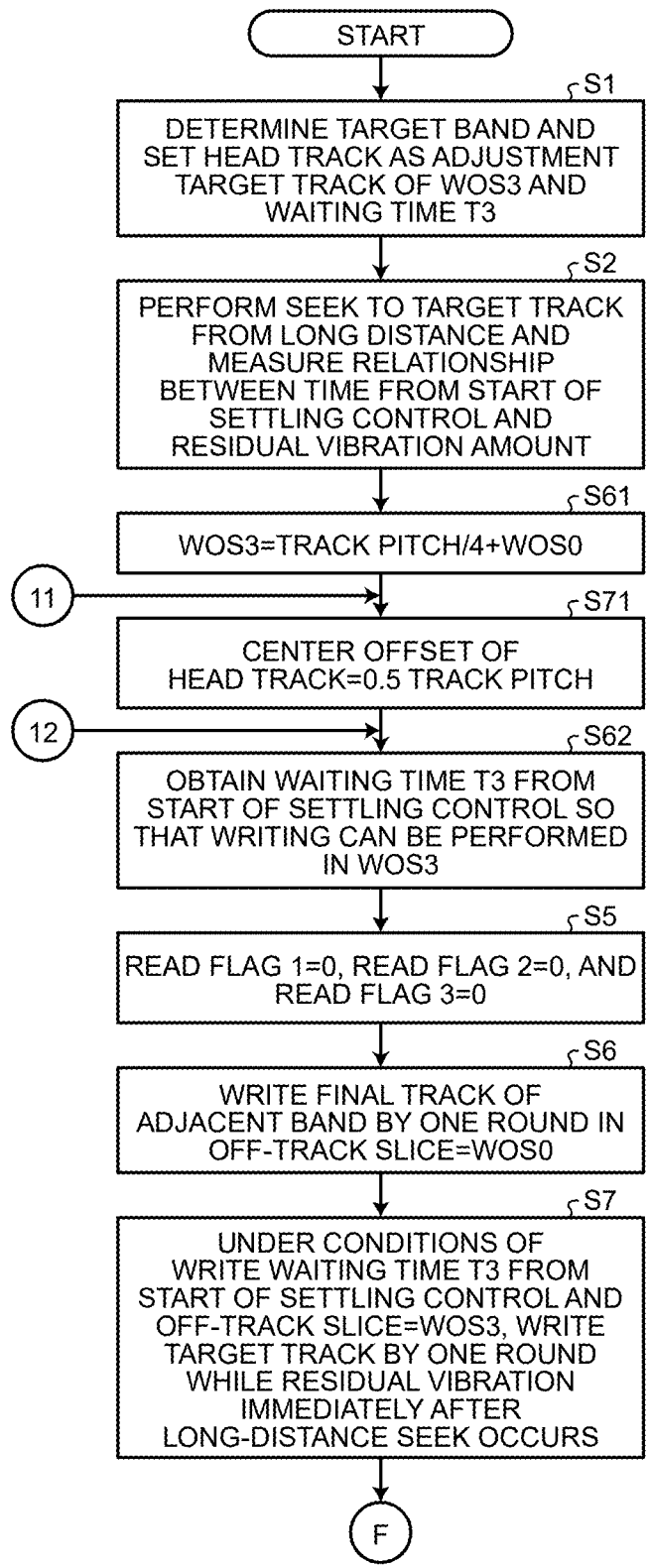
FIG. 23 is a flowchart illustrating an operation of a disk device according to the sixth embodiment.
Figure 24:
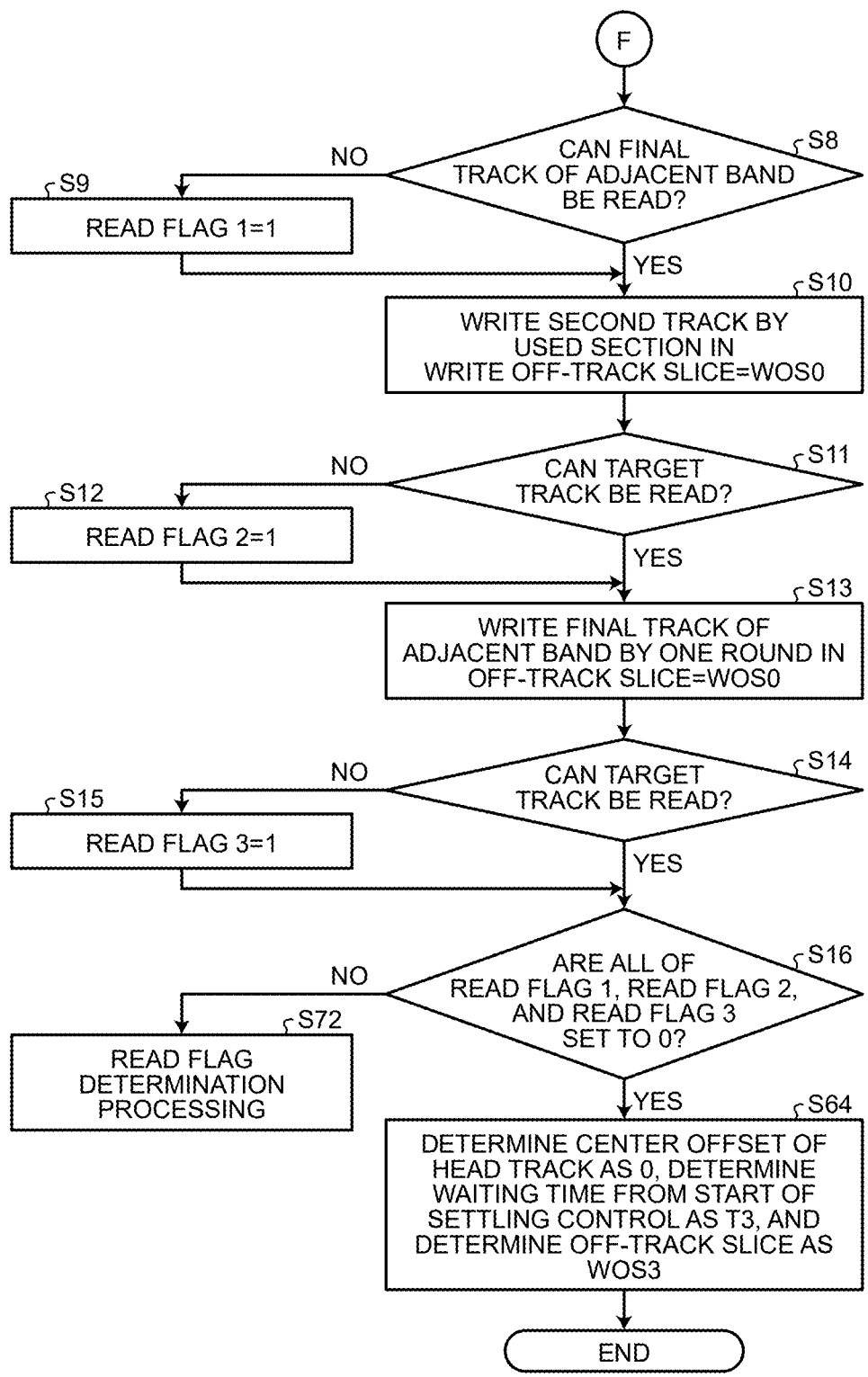
FIG. 24 is a flowchart illustrating the operation of the disk device according to the sixth embodiment.

The operation of the disk device 1 is different from that of the fifth embodiment in the following points, as illustrated in FIGS. 23 and 24. FIGS. 23 and 24 are flowcharts illustrating the operation of the disk device 1. The operation illustrated in FIGS. 23 and 24 can be mainly controlled by the controller 32.

After S1 to S61 are performed similarly to the fifth embodiment, the disk device 1 sets the initial value "0.5× STP" to the center offset ΔOF for the head data track DT_1 (adjustment target track) (S71). Thereafter, S62 to S16 are performed similarly to the fifth embodiment.

When at least one read flag of the read flag 1, the read flag 2, and the read flag 3 is "1" (No in S16), the disk device 1 performs read flag determination processing to suppress data loss (S72). As illustrated in FIG. 25, the disk device 1 may determine whether to reduce the off-track slice WOS3 or to shift and write the center position of the head data track DT_1 according to a combination of values of the read flag 1, the read flag 2, and the read flag 3. FIG. 25 is a diagram illustrating the read flag determination processing.

For example, when (read flag 1, read flag 2, read flag 3)=(0, 1, 0), the disk device 1 sets ΔOF=ΔOF1+0.5×STP such that the center offset ΔOF of the head data track DT_1 is shifted toward the adjacent band BN by the predetermined amount ΔOF1, and returns the processing to S62. The predetermined amount ΔOF1 can be experimentally determined in advance as an amount suitable for finely adjusting the center offset ΔOF.

When (read flag 1, read flag 2, read flag 3)=(0, 0, 1), the disk device 1 sets ΔOF=−ΔOF1+0.5×STP such that the center offset ΔOF of the head data track DT_1 is shifted toward the second data track DT_2 by the predetermined amount ΔOF1, and returns the processing to S62.

When (read flag 1, read flag 2, read flag 3)=(0, 1, 1), the disk device 1 reduces the off-track slice WOS3 by a predetermined amount, and returns the processing to S71. The predetermined amount can be experimentally determined in advance as an amount suitable for finely adjusting the off-track slice.

When (read flag 1, read flag 2, read flag 3)=(1, 0, 0), the disk device 1 sets ΔOF=−ΔOF1+0.5×STP such that the center offset ΔOF of the head data track DT_1 is shifted toward the second data track DT_2 by the predetermined amount ΔOF1, and returns the processing to S62.

When (read flag 1, read flag 2, read flag 3)=(1, 1, 0), the disk device 1 reduces the off-track slice WOS3 by the predetermined amount, and returns the processing to S71.

When (read flag 1, read flag 2, read flag 3)=(1, 0, 1), the disk device 1 sets ΔOF=−ΔOF1+0.5×STP such that the center offset ΔOF of the head data track DT_1 is shifted toward the second data track DT_2 by the predetermined amount ΔOF1, and returns the processing to S4.

When (read flag 1, read flag 2, read flag 3)=(1, 1, 1), the disk device 1 reduces the off-track slice WOS3 by the predetermined amount, and returns the processing to S71.

When all of the read flag 1, the read flag 2, and the read flag 3 are "0" (Yes in S16), the disk device 1 determines the center offset of the head data track DT_1 in the target band BN as 0.5×STP, determines the waiting time from the start of the settling control as T1, and determines the off-track slice as WOS3 (S64).

As described above, in the sixth embodiment, in the SMR method, when the amplitude of the residual vibration is generated asymmetrically with respect to the center position of the servo track, the disk device 1 performs the track arrangement in which the radial position of the head data track DT of the target band BN is further shifted from the position closer to the adjacent band BN side with respect to the center position of the servo track. As a result, since the write of the data track at the head of the band BN can be started while the residual vibration after seeking of the actuator arm 15 occurs asymmetrically, the write processing can be speeded up.

In addition, in the sixth embodiment, the disk device 1 performs a track arrangement in which the data track pitch on the head side is widened by writing the head data track in the band BN to be close to the adjacent band side in the SMR method. As a result, an off-track slice larger than other data tracks can be applied to the data track on the head side to reduce the waiting time T3 of the settling processing, and the writing of the data track on the head of the band BN can be started while the residual vibration after seeking of the actuator arm 15 occurs, such that the write processing can be speeded up.

Note that, considering a case in which a shake amount of the residual vibration changes depending on a seek distance, the disk device 1 may be configured to be able to select execution or non-execution of a track arrangement in which the data track pitch on the head side is widened by writing the data track on the head in the band BN to be close to the adjacent band side according to the radial position of the band BN. For example, the disk device 1 may not perform the arrangement in the band BN (for example, band BN2) near the middle circumference of the disk 11 in which the maximum seek distance becomes half, and may perform the arrangement in other bands BN (for example, bands BN1 and BN3). As a result, it is possible to suppress the influence of the residual vibration while suppressing deterioration in data format efficiency, and to speed up the write processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a head;
   a disk including at least one band; and
   a controller that writes a plurality of tracks in the band when a target track is written while being partially overlapped with a track adjacent to the target track in each of the at least one band such that a track pitch on a head side of the band is larger than other track pitches in a first circumferential position range and the track pitch on the head side of the band is equivalent to the other track pitches in a second circumferential position range, the second circumferential position range being circumferentially adjacent to the first circumferential position range.

2. The disk device according to claim 1, wherein the controller writes each of a first track, a second track, and a third track in the band to have a track arrangement in which a track pitch between the first track and the second track is larger than a track pitch between the second track and the third track.

3. The disk device according to claim 1, wherein the controller writes each of a first track, a second track, and a third track in the band to have a track arrangement in which a track pitch between the first track and the second track is set to an integral multiple of a track pitch between the second track and the third track.

4. The disk device according to claim 1, wherein the controller writes each of a first track, a second track, and a third track in the band to have a track arrangement in which, when N is an integer of 2 or more, a track pitch between the first track and the second track is set to "N + a decimal number less than 1" times a track pitch between the second track and the third track.

5. The disk device according to claim 1, wherein the controller writes each of a first track, a second track, and a third track in the band to have a track arrangement in which, when N is an integer of 2 or more, a track pitch between the first track and the second track is set to "N − a decimal number less than 1" times a track pitch between the second track and the third track.

6. The disk device according to claim 1, wherein the controller writes each of a first track, a second track, and a third track in the band to have a track arrangement in which a track pitch between the first track and the second track is set to "1+ a decimal number less than 1" times a track pitch between the second track and the third track.

7. The disk device according to claim 2, wherein the controller writes the first track using a first off-track slice, and writes each of the second track and the third track using a second off-track slice.

8. The disk device according to claim 7, wherein the first off-track slice is larger than the second off-track slice.

9. The disk device according to claim 1, wherein the controller writes each of the first track, the second track, and a third track in the band such that the first track is radially adjacent to the third track with a gap in the first circumferential position range, and the first track is radially adjacent to the third track with the second track sandwiched between the first track and the third track in the second circumferential position range.

10. The disk device according to claim 1, wherein the controller writes each of the first track, the second track, and a third track in the band such that the first track is radially adjacent to the third track with a gap and the third track is radially adjacent to a fourth track in the first circumferential position range, and the first track is radially adjacent to the third track with the second track sandwiched between the first track and the third track and the third track is radially adjacent to the fourth track in the second circumferential position range.

11. The disk device according to claim 9, wherein the first circumferential position range corresponds to a write start position of the first track, and the second circumferential position range corresponds to a write start position of the second track.

12. The disk device according to claim 10, wherein the first circumferential position range corresponds to a write start position of the first track, and the second circumferential position range corresponds to a write start position of the second track.

13. The disk device according to claim 9, wherein the controller writes each of the first track, the second track, and the third track in the band such that a track pitch between the first track and the second track is larger than a track pitch between the second track and the third track in the second circumferential position range.

14. The disk device according to claim 13, wherein the controller writes each of the first track, the second track, and the third track in the band to have a track arrangement in which a track pitch between the first track and the third track is set to "2+ a decimal number less than 1" times a track pitch between the third track and a fourth track in the first circumferential position range, and the track pitch between the first track and the second track is set to "1+ the decimal number less than 1" times the track pitch between the second track and the third track in the second circumferential position range.

15. The disk device according to claim 9, wherein the controller writes the first track using a first off-track slice in the first circumferential position range, writes the first track using a second off-track slice in the second circumferential position range, and writes each of the second track and the third track using the second off-track slice in the first circumferential position range and the second circumferential position range.

16. The disk device according to claim 15, wherein the first off-track slice is larger than the second off-track slice.

17. The disk device according to claim 2, wherein the controller is capable of selecting, for each of the at least one band, execution or non-execution of a track arrangement in which the track pitch between the first track and the second track is larger than the track pitch between the second track and the third track according to a radial position of the band including the first track, the second track, and the third track.

18. The disk device according to claim 1, wherein the controller is capable of selecting, for each of the at least one band, execution or non-execution of limitation of a use range in a circumferential direction of the second track according to a radial position of the band including the first track, the second track, and a third track.

* * * * *